(12) United States Patent
Jones et al.

(10) Patent No.: US 10,589,898 B2
(45) Date of Patent: Mar. 17, 2020

(54) COLLAPSIBLE REUSABLE PALLET

(71) Applicant: RMC Jones LLC, Prior Lake, MN (US)

(72) Inventors: Robert J. Jones, Prior Lake, MN (US); Michael R. Jones, Apple Valley, MN (US)

(73) Assignee: RMC Jones LLC, Prior Lake, MN (US)

( * ) Notice: Subject to any disclaimer, the term of this patent is extended or adjusted under 35 U.S.C. 154(b) by 0 days.

(21) Appl. No.: 16/154,149

(22) Filed: Oct. 8, 2018

(65) Prior Publication Data
US 2019/0233162 A1 Aug. 1, 2019

Related U.S. Application Data

(60) Provisional application No. 62/623,597, filed on Jan. 30, 2018.

(51) Int. Cl.
*B65D 19/00* (2006.01)
*B65D 19/38* (2006.01)
*B65D 19/36* (2006.01)

(52) U.S. Cl.
CPC ..... *B65D 19/0069* (2013.01); *B65D 19/0075* (2013.01); *B65D 19/0097* (2013.01); *B65D 19/36* (2013.01); *B65D 19/38* (2013.01); *B65D 2519/00029* (2013.01); *B65D 2519/00034* (2013.01); *B65D 2519/00044* (2013.01); *B65D 2519/00064* (2013.01); *B65D 2519/0087* (2013.01); *B65D 2519/0099* (2013.01); *B65D 2519/00238* (2013.01); *B65D 2519/00273* (2013.01); *B65D 2519/00293* (2013.01); *B65D 2519/00323* (2013.01); *B65D 2519/00338* (2013.01); *B65D 2519/00343* (2013.01); *B65D 2519/00567* (2013.01);
(Continued)

(58) Field of Classification Search
CPC ..... B65D 19/0069; B65D 19/00; B65D 19/44
USPC .......................... 108/51.11, 51.3, 56.1, 55.3
See application file for complete search history.

(56) References Cited

U.S. PATENT DOCUMENTS 2,503,022 A * 4/1950 Benoist .............. B65D 19/0095
108/56.1
2,783,960 A * 3/1957 Herz .................. B65D 19/0069
108/56.1
(Continued)

OTHER PUBLICATIONS

Pressed Wood Pallets http://uline.com/BL_8203/Pressed-Wood-Pallets retrieved Dec. 4, 2018.
(Continued)

*Primary Examiner* — Jose V Chen
(74) *Attorney, Agent, or Firm* — Merchant & Gould P.C.

(57) ABSTRACT

A pallet for supportively carrying and transporting goods as a unit load in a stable efficient manner is disclosed. The pallet can be configured as a rigid or easily disassemblable compact collapsed structure. Interlocking frame members form an upper planar surface with one or more gap or void areas. A sheet of flexible material operatively secured to the frame is tautly stretched to overlie the void areas and forms a structural part of the upper planar surface to counteract downward load forces applied to the fabric over the pallet surface void areas. The sheet material preferably comprises woven polypropylene material.

21 Claims, 17 Drawing Sheets

(52) U.S. Cl.
CPC ............. *B65D 2519/00572* (2013.01); *B65D 2519/00815* (2013.01); *B65D 2519/00985* (2013.01)

(56) References Cited

U.S. PATENT DOCUMENTS

| | | | | |
|---|---|---|---|---|
| 3,026,078 A * | 3/1962 | Simkins | ............ | B65D 19/0016 108/51.3 |
| 3,041,029 A * | 6/1962 | Brown | ............... | B65D 19/0026 108/51.3 |
| 3,255,720 A * | 6/1966 | Pasquier | ............ | B65D 19/0026 108/51.11 |
| 3,256,839 A * | 6/1966 | Peterson | ............ | B65D 19/0073 108/56.1 |
| 3,301,200 A * | 1/1967 | Landsiedel | ........ | B65D 19/0028 108/56.1 |
| T886,012 I4 * | 5/1971 | Small | ................ | B65D 19/0097 108/57.25 |
| 3,945,493 A | 3/1976 | Cardinal | | |
| 4,907,515 A * | 3/1990 | Win | ................... | B65D 19/0073 108/57.25 |
| 5,323,922 A | 6/1994 | LaPoint, Jr. | | |
| 5,615,608 A * | 4/1997 | Shaw | ................ | B65D 19/0018 108/55.3 |
| 5,690,037 A * | 11/1997 | Hill | ................... | B65D 19/0026 108/51.11 |
| 5,758,973 A | 6/1998 | LaFleur | | |
| 5,795,282 A | 8/1998 | deMunnik | | |
| 5,890,437 A * | 4/1999 | Hill | ................... | B65D 19/0026 108/51.11 |
| 6,112,672 A * | 9/2000 | Heil | ................... | B65D 19/0026 108/54.1 |
| 6,431,435 B1 | 8/2002 | Jones | | |
| 6,932,266 B2 | 8/2005 | Jones | | |
| 6,973,882 B2 * | 12/2005 | Baechle | ............ | B65D 19/0095 108/51.3 |
| 7,219,609 B1 * | 5/2007 | Utz | ........................ | B65D 19/44 108/55.3 |
| 7,434,721 B2 | 10/2008 | Feltz | | |
| 7,516,706 B2 * | 4/2009 | Creighton | .......... | B65D 19/0026 108/56.3 |
| 7,644,665 B2 * | 1/2010 | Creighton | .......... | B65D 19/0026 108/56.3 |
| 7,793,828 B2 * | 9/2010 | Booth | ................ | G06Q 20/1085 235/379 |
| 8,221,869 B2 * | 7/2012 | Pare | ................... | B65D 71/0096 108/51.3 |
| 8,256,621 B2 * | 9/2012 | Deiger | ................. | B65B 11/025 108/51.3 |
| 8,397,916 B1 * | 3/2013 | Cassidy | ............ | B65D 19/0026 108/51.3 |
| 8,814,031 B2 | 8/2014 | Graham | | |
| 8,978,964 B1 | 3/2015 | Ruggiere | | |
| 10,065,782 B1 | 9/2018 | Jones | | |
| 10,071,842 B2 | 9/2018 | Jones | | |
| 2008/0083354 A1 * | 4/2008 | Markert | ................ | B65D 19/36 108/55.3 |
| 2008/0196633 A1 * | 8/2008 | Ho | ..................... | B65D 19/0075 108/51.3 |

OTHER PUBLICATIONS

New Wood Pallets http://uline.com/BL_817/New-Wood-Pallets retrieved Dec. 4, 2018.
Block Wood Pallets http://uline.com/BL_718/Block-Pallet retrieved Dec. 4, 2018.
Roackable Pallets http://uline.com/BL_8204/Rackable-Pallet retrieved Dec. 4, 2018.
Aluminum Pallets http://uline.com/BL_367/Aluminum-Pallets retrieved Dec. 4, 2018.
Galvanized Steel Pallet http://uline.com/BL_2298/Galvanized-Steel-Pallet retrieved Dec. 4, 2018.
Heavy Duty Nestable Pallet http://uline.com/BL_8208/Heavy-Duty-Nestable-Pallet retrieved Dec. 4, 2018.
Solid Top Rackable Pallets http://uline.com/BL_1417/Solid-Top-Rackable-Pallets retrieved Dec. 4, 2018.

* cited by examiner

COLLAPSIBLE REUSABLE PALLET

This application claims priority from U.S. Provisional Patent Application Ser. No. 62/623,597 filed in the U.S. Patent and Trademark Office on Jan. 30, 2018 by Robert J. Jones et al. and entitled FOLDABLE/COLLAPSIBLE REUSABLE PALLET, the entire contents of which are herein incorporated by reference.

FIELD OF THE INVENTION

This invention relates generally to a pallet, which is defined as a portable flat rigid platform structure used as a base for assembling, storing, stacking, handling and transporting goods as a unit load in a stable efficient fashion. More particularly, the invention relates to a pallet having a unique frame and top deck structure incorporating a continuous cover sheet of material providing structural strength, improved sanitation, and enables the pallet to be repeatedly collapsed and compacted for transport and readily reassembled again for use.

BACKGROUND

Pallets are universally used in virtually all industries. Most industrial pallets are rigidly constructed of wood. However, other materials such as plastic, metal, paper and recycled materials have also been used in their construction. Each material has advantages and disadvantages relative to the others and to their respective intended uses. Most industrial pallets are designed to be lifted and moved by means of a Forklift and/or hand operated pallet jacks. Most pallets have a generally planar upper deck surface for supporting the load to be carried by the pallet.

Wooden pallets are susceptible to bacterial and chemical contamination that can be problematic in food and produce transportation. They also exhibit relatively poor resistance to weathering, rot and chemicals, and are subject to splintering and dislodgement of nails and staples used in their construction. However, since they are relatively lower in cost than alternatively constructed pallets, wood pallets are most commonly used. Steel pallets are strong and used for heavy and/or highly stacked loads. However, they have a higher initial price, are significantly more heavy than wooden pallets, and when made from carbon steel, are susceptible to rusting. Aluminum pallets are stronger than those of wood or plastic, are lighter than steel and resist weathering, rotting, plastic creep and corrosion and are good for air freight and sea storage applications. Paper pallets are often used for light loads and can be recycled for easy disposal. They are cleaner, safer and can provide a cost saving, eco-friendly alternative to other pallet materials. However, they are subject to weathering and moisture that weakens their structure.

Although wooden pallets come in many sizes and configurations, they generally fall into two very broad categories, generally referred to as stringer pallets or block pallets. Stringer pallets generally have a lower support structure of three or more continuous, longitudinally extending solid or notched wooden beams which support upper deck board components nailed perpendicularly to and across the lower beams. The upper deck boards are often identified by their location, as for example "outside" or "center" stringers. Block pallets are those which have wooden blocks between upper deck boards or between upper and lower decks. A pallet with top and bottom decks are referred to as "double face pallets". Pallets are also referred to as "two way" or "four way" pallets which refers to the number of directions from which they can be lifted using Forklift or hand pallet jacks.

A number of different organizations and associations work towards establishing and promogating standards for pallets. Some strive to develop standards for pallet dimensions or materials used in their construction. Others focus on standards for a specific industry or type of load material being carried by the pallet. Companies utilize hundreds of different pallet sizes and use both stringer and block pallets to meet specific end user requirements. In the United States, stringer pallet constructions basically follow the GMA (Grocery Manufacturers Association) standards. Block pallet configurations typically follow the standards of the pallet rental companies regarding packaging, palletizing, warehousing and transportation. For example, the beverage industry segment uses a 48" by 42" pallet. No single dimensional standard governs pallet production, since the size of pallets differ from and are favored by one industry as compared to another. For example, the most common footprint size of a pallet used by the Grocery Food industry, and many others, is a 48" by 40" pallet. There are basically twelve different industries in the United States that utilize a common size, and the most used pallet in North America is the wooden 48"×40" pallet.

The rigid construction of known pallets does not readily lend them to be easily disassembled for collapsibility or for replacement of worn or damaged parts of the pallet. Further, in certain pallet use situations such as for the transport of bulk material containers housing flowable or semi-fluid materials such as chicken or other meat, the pallet or its use can contribute to contamination of the bulk material. For example, bulk material containers carrying 2,000 lb. loads of semi-fluid chicken are typically carried by wooden pallets having spaced wooden slats forming their upper deck surface. To empty the container at the meat processing plant, the pallet and bulk container are tipped (rotated) to allow the container contents to flow into an underlying receptor. In the process, dirt carried by or on the pallet and/or loose portions of the pallet such as wooden splinters, nails and staples, can be deposited along with the meat, thereby contaminating the food product. Storage and/or transport and handling of used pallets back to an industrial loading location can also be expensive due to their size and rigid construction.

The present invention addresses the above industry needs by introducing an improved pallet configuration having an interlocked top deck and frame construction that provides structural strength to the pallet and enables reduction in the number of top deck boards, and one that enables the pallet to be collapsed and folded into a compact configuration for transport and storage when not in use, and readily reassembled for subsequent use. The improved pallet also provides improved sanitation to the load being carried by the pallet besides providing handling, storage and shipment efficiency and cost savings to the pallet manufacturer, distributor and the end customer.

SUMMARY OF THE INVENTION

This invention uses existing packaging industry accepted materials to configure a pallet having a unique frame and top deck structure that provides exceptional structural strength and improved sanitation while enabling the pallet to be readily disassembled for compact storage and transport when not in use, and rapid reassembly for subsequent use as a pallet. The invention reduces the number of pallet deck stringers or slats conventionally used in rigid wooden pallet construction and replaces the conventional construction with a relatively open interlocking frame construction, covered by a strong sheet material tautly secured to and stretched over the frame in a manner that provides a support deck having strong structural strength with load support specifications equal to or better than those of prior art conventional wooden pallet constructions. The principles of the inventive pallet design are adaptable to pallets of any size or configuration, and offer significant construction cost reduction advantages over known pallets and the ability to readily disassemble and collapse the pallet by 50 percent or more, providing additional savings in storage and/or transport costs of fully assembled pallets when not being used for supporting loads. Collapsibility of the pallet enables multiple storage, reuse and shipment cycling of the pallet, which has not been economically available with prior rigid pallet designs.

While the principles of the invention apply to pallets constructed of other materials, the greatest cost savings are realized by using its principles to construct pallets having wooden frames. Further, while pallet deck covering and supportive sheet materials can comprise many different materials as discussed in the prior Background section, a woven fabric sheet material, preferably polypropylene fabric material having its woven surfaces embedded with a liquid coating of polypropylene resin, provide a very strong fabric that also has waterproof qualities. Such polypropylene woven fabrics are well known and used in the packaging industry and for containing heavy loads of bulk materials that often require a working load strength safety ratio of 5:1. The fabric sheet material is preferably configured to cover all or substantially all of the upper deck area of the pallet, which provides an additional benefit, particularly when used with pallets carrying large bulk material containers that are tipped by the pallet for emptying, to prevent debris and dislodged portions of the pallet from falling into and contaminating the bulk material during emptying of the container. An additional advantage of the pallet design is that the polypropylene fabric is readily replaceable and recyclable, as are the other component parts of the pallet. The strong fabric material also helps to prevent racking or twisting of the underlying interlocking pallet frame.

The interlocking frame members define a planar upper deck surface for supporting a container and its load. Due to the reduction of stringers of conventional wooden pallet designs, there are gaps or void areas of the planar support deck surface that are not spanned by the frame members of the inventive pallet design. The primary purpose of the fabric sheet material is to overlie such deck surface gaps or voids and to provide structural strength for supporting an overlying container and its load. The fabric provides upward forces at the upper deck surface that oppose the downward weight forces that the container and its load apply to the deck surface. The fabric is designed to have a strength for providing such upward countering forces that are equal to or greater than the downward weight forces applied by the container/load, and preferably a working load strength safety ratio that is at least 2:1 or preferably 5:1 or greater than that of the maximum weight load for which the pallet is designed. The fabric sheet material can also be woven to have weft threads that are thicker/stronger than the fabric's warp threads, such that the fabric can be configured to overlie open gap or void deck surface areas created by the frame structure, in a manner that provides the greatest fabric support strength over such void areas.

The inventive pallet further can be configured with load centering devices that assist those who place containers on the pallet, by engaging side walls of a container being placed onto the upper pallet deck surface, when the container moves to the peripheral edge of the upper deck surface, and redirects motion of the container away from the pallet's peripheral edge, so that it is fully supported by the deck surface. The container centering helps to minimize costly rupture of unsupported portions of the container during shipment and resultant loss or spilling of the load, and costly cleanup and removal of any contamination caused by the spill or leakage.

According to one aspect of the invention, there is provided a pallet configured to rest upon a lower support surface and to support a load having a maximum load weight, comprising: (a) a frame having a plurality of interconnected first and second frame members oriented generally perpendicularly to one another with at least some of the first and second frame members having coplanar upper surfaces cooperatively defining a planar upper deck surface with at least one void or gap region in the planar deck surface; (b) a continuous sheet of material overlying the deck surface, secured to and tautly stretched between at least two of the frame members and overlying at least one of the void or gap regions in the plane, to provide upward support forces to counteract downward forces applied to the sheet material by a load placed on and carried by the upper deck surface and engaging the sheet material above the covered void or gap region; wherein the strength of the sheet upward support forces is at least equal to or greater than downward load forces that could be produced by the load and having the maximum load weight; and (c) spaced leg members operatively connected to the frame so as to support the upper deck surface in spaced relationship above the lower support surface, to enable pallet lifting arms to be inserted between the leg members and under the upper deck, to lift the pallet above the lower support surface.

According to a further aspect of the invention, the first and second frame members of the pallet are arranged and configured in interlocking manner. According to yet a further aspect of the invention, the first and second frame members comprise wood. According to another aspect of the invention, the first and second frame members are detachably secured to one another such that the pallet can be readily disassembled and compacted for storage or transport, and subsequently reassembled for operative use. When disassembled, the collapsed and compacted disassembled pallet is at least 20 percent less than that of the assembled pallet, and preferably at least 40 percent or more, less than that of the assembled pallet. One method of assembling the frame members and overlying sheet material is by using bolts that can readily secure and unsecure the component parts of the pallet into operable and disassembled configurations.

According to yet a further aspect of the invention, the pallet frame members define an upper deck surface that has a plurality of void or gap regions, and wherein the sheet material is arranged and configured to operatively overlie such plurality of void or gap regions. Such sheet material may comprise a plurality of sheets of material which collectively operatively overlie the plurality of void or gap regions, or may comprise a single sheet of material that would overlie the plurality of void or gap regions or could overlie substantially the entire planar upper deck surface of the pallet.

According to yet another further aspect of the invention, the sheet material comprises a woven fabric material wherein the woven fabric sheet material comprises polypropylene material. The woven polypropylene material can also have its woven surfaces embedded with a liquid coating of polypropylene resin to provide a stronger fabric that also has waterproof qualities. According to yet a further aspect of the invention, the sheet material of the pallet has a working load strength ratio compared to the maximum load weight supported by the pallet, of greater than or equal to 2:1. According to yet a further aspect of the invention, the sheet material of the pallet has a working load strength ratio compared to the maximum load weight supported by the pallet of greater than or equal to 5:1. According to a further aspect of the invention, the sheet material when comprised of woven polypropylene material has a fabric weight equal to or greater than 5 oz. per sq.yd. According to yet a further aspect of the invention, when the sheet material comprises a woven polypropylene material, the opposed longitudinal edges of the stretched sheet material can be folded over and hot fused to a bottom surface of the sheet material, to avoid unraveling or damage to the longitudinal edges of the stretched sheet material.

According to yet a further aspect of the invention, the pallet comprises load centering devices operatively secured to the pallet and extending upwardly above the upper planar surface of the deck along opposed edges of the pallet deck surface, to assist in positioning and centering containers on the upper deck surface.

According to a further aspect of the invention there is provided a pallet for supporting a load contained within a container having a bottom surface defining an outer peripheral footprint pattern, comprising: (a) a pallet frame structure defining a planar upper deck surface for supporting the container and contained load, wherein the upper deck surface has an outer peripheral footprint dimensioned larger than that of the container footprint such that the deck surface is capable of fully supportively engaging the bottom surface of the container; and (b) container centering devices operatively secured along opposed outer edges of the deck surface peripheral footprint and rising above the planar upper deck surface, arranged and configured to engage and apply centering forces to sides of the container during placement of the container onto the deck surface, to assist in positioning the container on the upper deck surface so that the bottom of the container does not extend beyond the outer peripheral footprint of the pallet upper deck surface. According to yet a further aspect of the invention, the pallet with container centering devices further comprises a plurality of spaced leg portions operatively connected to or forming a part of the pallet frame structure, arranged and configured to support the upper deck surface in spaced relationship above a lower support surface, to enable pallet lifting arms to be inserted between the spaced leg portions and below the upper deck, to lift the pallet above the lower support surface; and wherein at least some of the container centering devices are aligned with the leg portions, so as not to interfere with lifting operations of the pallet.

According to yet a further aspect of the invention, there is provided a collapsible pallet for supporting a load, comprising: (a) a plurality of longitudinal frame members oriented in parallel spaced relationship to one another and having coplanar upper portions; (b) a plurality of lateral frame members operatively connected to the longitudinal frame members, oriented in parallel spaced relationship to one another and generally perpendicular to the longitudinal frame members, wherein the lateral frame members have upper surfaces that are coplanar with the coplanar upper portions of the longitudinal frame members and cooperatively form therewith a planar upper deck surface; (c) wherein the longitudinal and the lateral frame members are rigidly, but detachably secured to one another so as to form one or more gaps or voids in the planar upper deck surface; and (d) at least one flexible sheet of material overlying the planar deck upper surface, tautly secured to opposed ones of the lateral frame members and arranged and configured to overlie and span across at least one of the gaps or voids in the planar upper deck surface to strengthen the upper deck surface; wherein the sheet material has a strength sufficient to counteract downward forces applied to the sheet material by a load placed upon the sheet material overlying the at least one gap or void in the upper deck surface. According to a further aspect of the invention, the longitudinal and lateral frame members are detachable from one another in a manner such that when detached they can be compacted for transport and storage and readily reassembled into an operative pallet. According to yet a further aspect of the invention, the sheet material of the collapsible pallet comprises polypropylene fabric configured to span across substantially the entire planar upper deck surface of the pallet.

These and other features of the invention will become apparent from a more detailed description of various embodiments of the invention as described below.

BRIEF DESCRIPTION OF THE DRAWING

Referring to the Drawing, wherein like numerals represent like parts throughout the several views.

DETAILED DESCRIPTION OF THE PREFERRED EMBODIMENTS

Preferred embodiments of the invention will be described with respect to a pallet having an upper rectangular surface or a top deck footprint of 48 inches by 40 inches or (48"×40"), and one in which the lower framework structure is made from wooden components, the most commonly used pallet material. Those skilled in the art will readily recognize that the broad principles of this invention apply to pallets of both larger and smaller dimensions and to the use of materials other than wood, such as plastic or metal, in configuring the pallet framework support structure. Further, the terms "sheet" or "sheet material" will be interchangeably used in describing an upper structural deck component of the pallet. It will be understood that such term is being used generically and that it applies to both woven fabric and non-woven materials. Although embodiments used herein to describe the invention refer to particular types of woven sheet material, it will be understood that various other materials may be used to satisfy the pallet strength requirements for particular pallet use applications. These and other possible material and structural variants will be brought to the readers' attention in the ensuing embodiment descriptions and/or will be readily recognizable by those skilled in the art.

Pallets constructed according to this invention reduce the number of wooden members and the volume of wooden material traditionally used to construct wooden stringer or block pallets by eliminating at least one or more wooden slat or stringer members forming an upper deck surface of conventional pallets and by employing one or more pieces of sheet material arranged and configured to provide a pallet having load carrying strength equal to or greater than that of the wooden pallet configurations from which deck or frame members have been removed. The pallet can also be constructed for collapsibility into a compact structure for storage or transport when not in use, and readily reassembled into a usable pallet when desired. The pallet also provides improved sanitation, use efficiency and cost savings over prior art pallets.

Figure 1:
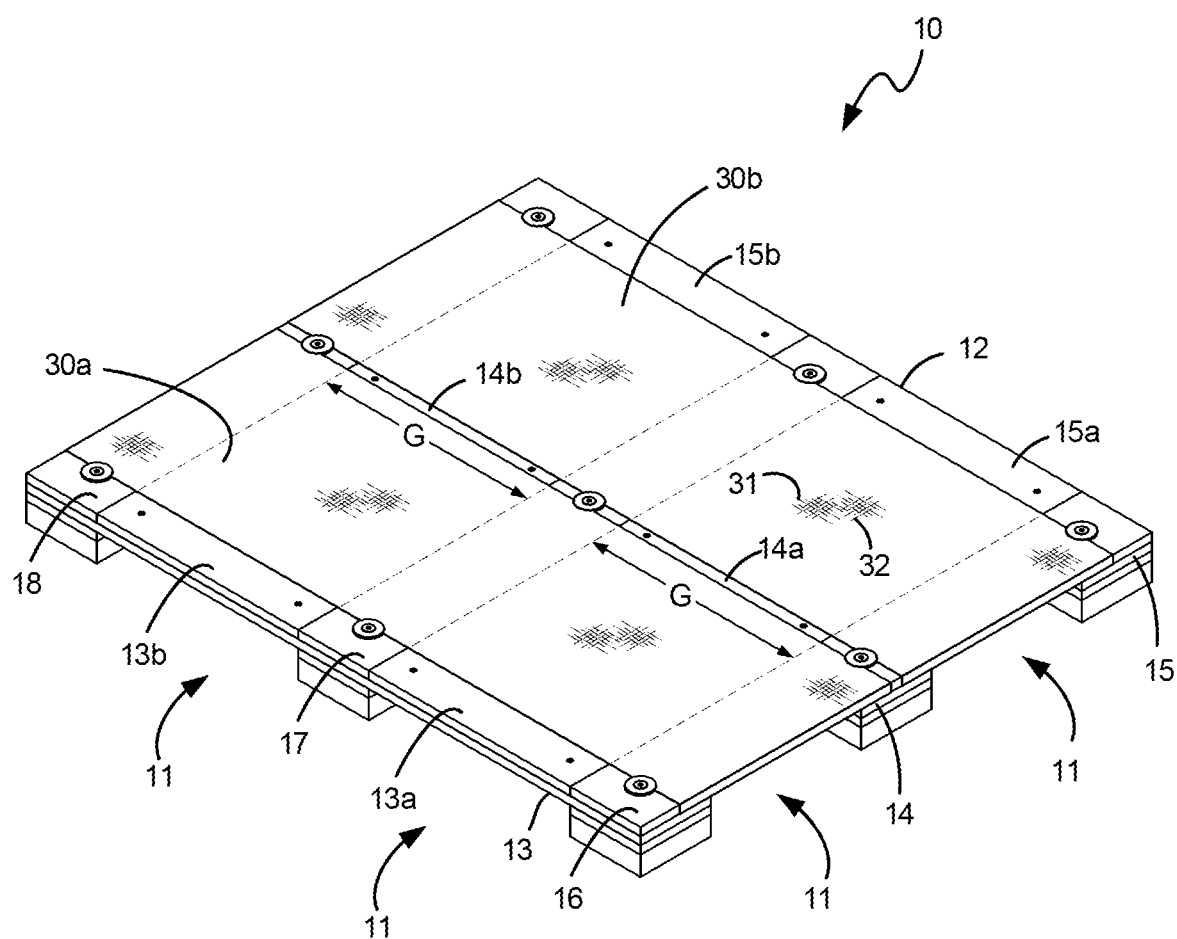
FIG. 1 is a diagrammatic perspective view of an assembled pallet of a first embodiment of the invention as viewed from an upper, side and front corner of the pallet.
Figure 2:
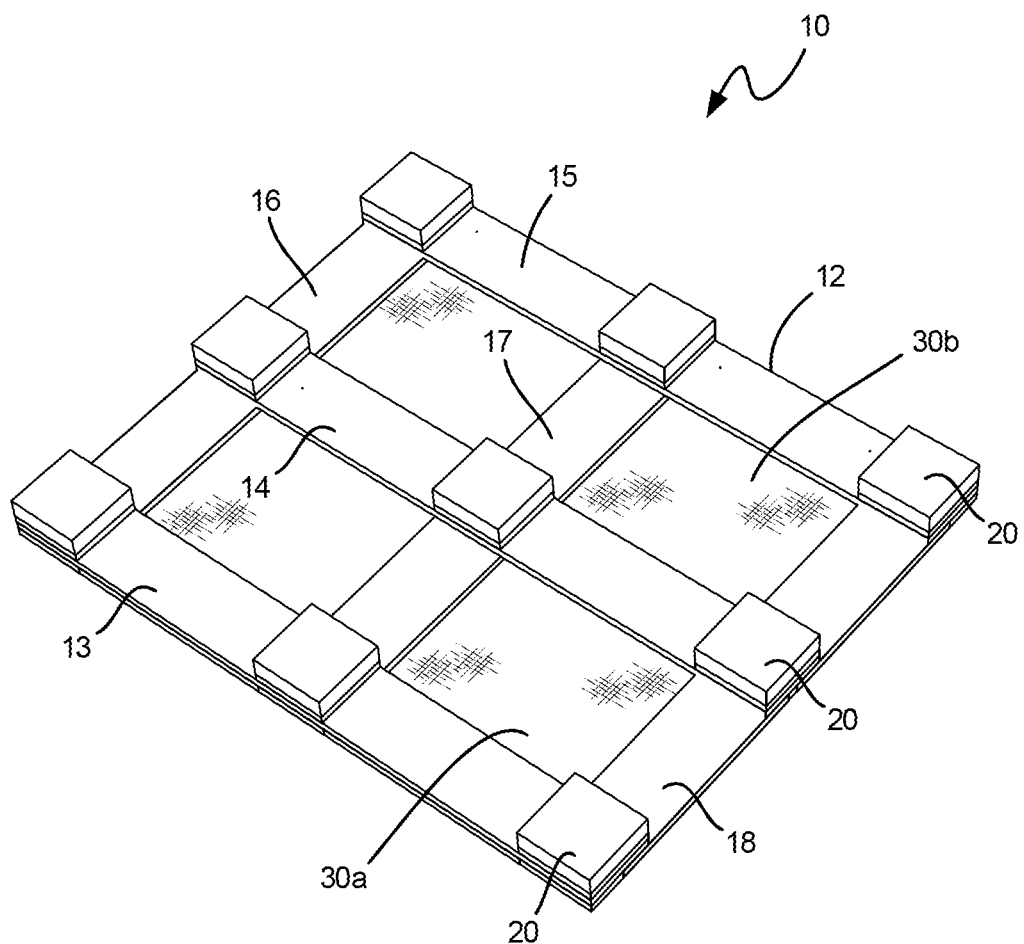
FIG. 2 is a diagrammatic perspective view of the bottom of the pallet of FIG. 1, viewed from a lower, side and back corner of the pallet.

A first embodiment of an operatively assembled pallet arranged and configured according to the principles of this invention is diagrammatically illustrated at 10 in FIGS. 1 and 2. The pallet 10 has an interlocked wooden upper frame 12 supported by nine aligned and spaced legs 20 which support the upper frame above a floor or other support surface (not illustrated) at a height sufficient to enable projecting lifting tines or arms of a Forklift or hand operated pallet jack to be inserted into the void spaces formed between the lower surface of the frame 12 and the floor/support surface and between adjacent aligned outer and middle legs, as illustrated by the arrows 11 in FIG. 1. In the pallet embodiment illustrated, such lifting tines or arms can be inserted within the receptor spaces 11 from any of the four sides of the pallet (i.e. four-way access) for lifting and moving the pallet.

Figure 3:
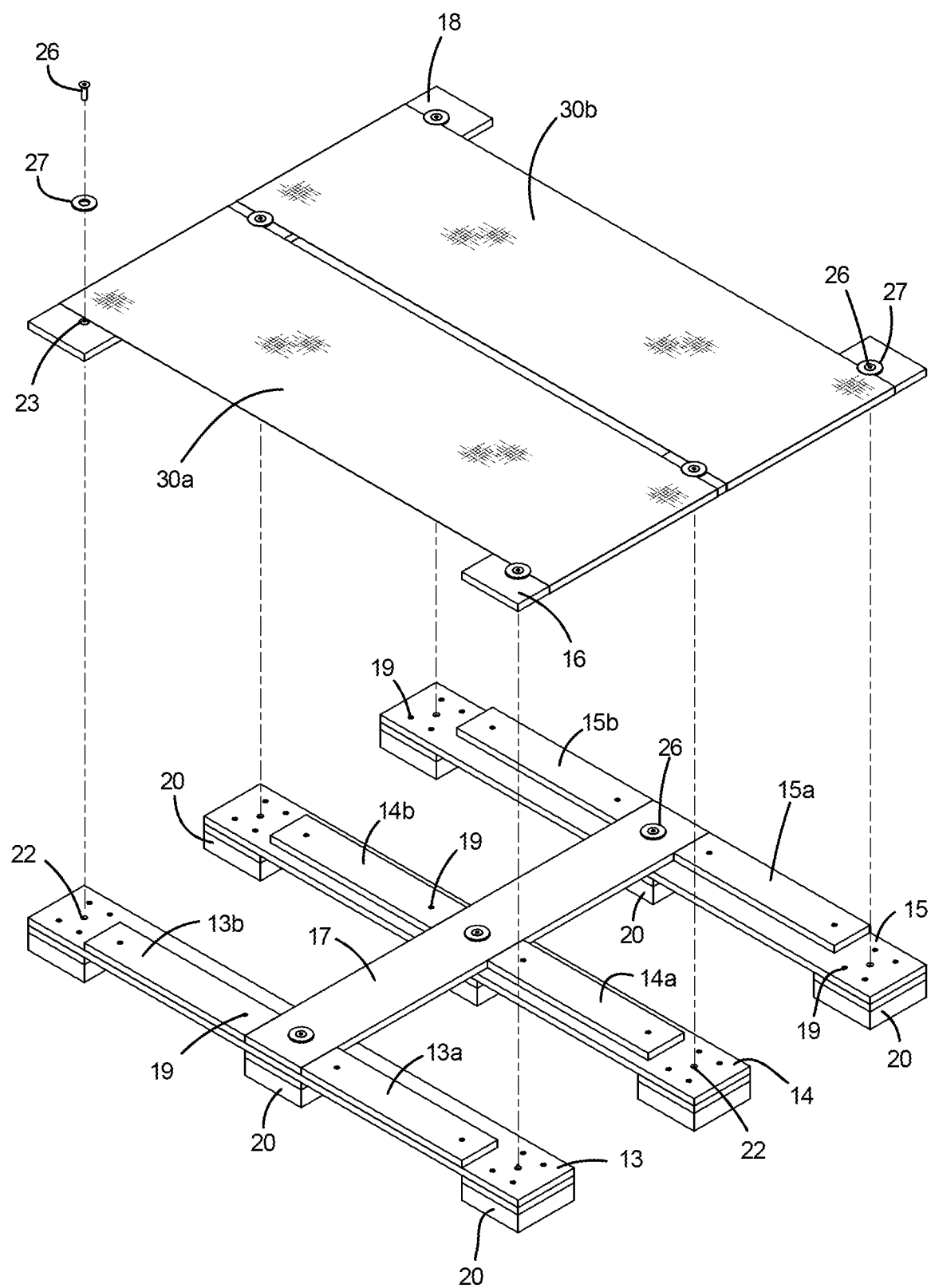
FIG. 3 is a partially exploded perspective view of the pallet of FIG. 1, illustrating the upper sheet material portions and opposed end slat boards to which the sheets are attached, shown detached from a lower frame portion of the pallet.

The frame 12 construction is described in greater detail with reference to FIGS. 3-6. It will be understood that the Figures illustrated in the Drawing are diagrammatic only, and not drawn to scale. FIG. 3 is an exploded view of the pallet 10 wherein the lower portion of FIG. 3 illustrates most of the frame 12, and the upper portion of the FIG. 3 illustrates a pair of sheet material portions 30a, 30b (described in more detail hereinafter) stretched between and connected to two lateral frame members 16 and 18 which when operatively tautly connected to the assembly shown in the lower portion of FIG. 3, complete the frame 12. The frame 12 has six interlocking and connected wooden frame members arranged to form a rectangular frame structure. Three 48" long longitudinal frame member portions 13, 14 and 15 are arranged in spaced parallel relationship to one another in a longitudinal direction. Three shorter 40" lateral frame member portions 16, 17 and 18 are arranged and spaced in parallel relationship to one another and lay directly upon and perpendicular to the three longitudinal frame members, in a lateral direction. The longitudinal frame members 13 and 15 form opposed outer longitudinal sides of the frame 12, and the longitudinal frame member 14 is centered between them. The laterally positioned frame members 16 and 18 form opposed outer lateral sides of the frame 12, and the lateral frame member 17 is centered between them. Each of the lateral frame members 16, 17 and 18 is directly operatively connected to each of the longitudinal frame members 13, 14 and 15, as further discussed below.

Each of the longitudinal frame members 13, 14 and 15 has a pair of alignment or positioning frame member portions 13a and 13b, 14a and 14b, and 15a and 15b respectively, secured to the upper surfaces of the longitudinal frame members and longitudinally aligned and spaced from each other and back from the opposed ends of the longitudinal frame members. The thickness of each of the positioning frame members 13a, 13b, 14a, 14b and 15a, 15b is identical to that of the lateral frame members 16, 17 and 18 such that all of their upper surfaces lie in a common plane and collectively form the upper deck surface of the frame 12. The lengths of the positioning frame members are sized and positioned on their respective longitudinal frame members 13, 14 and 15 such that they abut opposed sides of the lateral central frame member 17 with one of their respective ends, and the lateral end frame members 16 or 18 with their other ends. The outwardly facing side surfaces of positioning frame members 13a and 13b are vertically aligned (planar) with the outwardly facing side surfaces of the longitudinal frame member 13, and the outwardly facing sides of positioning frame members 15a and 15b are vertically aligned (planar) with the outwardly facing side surfaces of the longitudinal frame member 15. The positioning frame members 14a and 14b are centrally positioned along the longitudinal centerline of the longitudinal frame member 14. Three block-like legs 20 are secured in spaced longitudinal relationship and secured by screws 19 to the bottom surfaces of the longitudinal frame members 13, 14 and 15 at their opposed ends and centers. In the embodiment shown, each of the legs 20 is of laminate construction formed from two pieces of wood; however, it will be understood that a solid piece of material, or multiple pieces could be used to provide the desired structural strength and spacing between a floor or other support surface and the bottom surface(s) of the frame 12 that will be engaged by a Forklift or pallet jack. It will be appreciated that a longitudinal frame member and attached positioning members could be formed from a single piece of material.

Component dimensions for the 48"×40" pallet embodiment of FIG. 3 could be: longitudinal frame members 13, 14, 15 (48" long, 5.5" wide, 0.625" thick); lateral frame members 16, 17, 18 (40" long, 5.5" wide, 0.625" thick); positioning frame members 13a, 13b, 14a, 14b, 15a, 15b (15.625" long, 3.5" wide, 0.625" thick); stacked board support leg configurations 20 (5.5" long, 5.5" wide, 1.5" thick) for the lower component and (5.5" wide, 5.5" long, 0.625" thick) for the upper component, providing 2.125" high legs and clearance for the pallet lifting void areas 11. It will be appreciated that other frame and frame component configurations and dimensions of respective component parts can be configured and sized. The specific pallet embodiment(s) shown and component dimensions used are only exemplary of how the present invention can be implemented and are not intended to be limiting to the scope of the invention. It will be understood that once a particular pallet configuration is selected, the component specifications for that pallet will be determined in large measure by the load specifications required to be supported by the pallet, by the particular use to which the pallet will be put, and by the industry standards which the pallet must meet.

Figure 5:
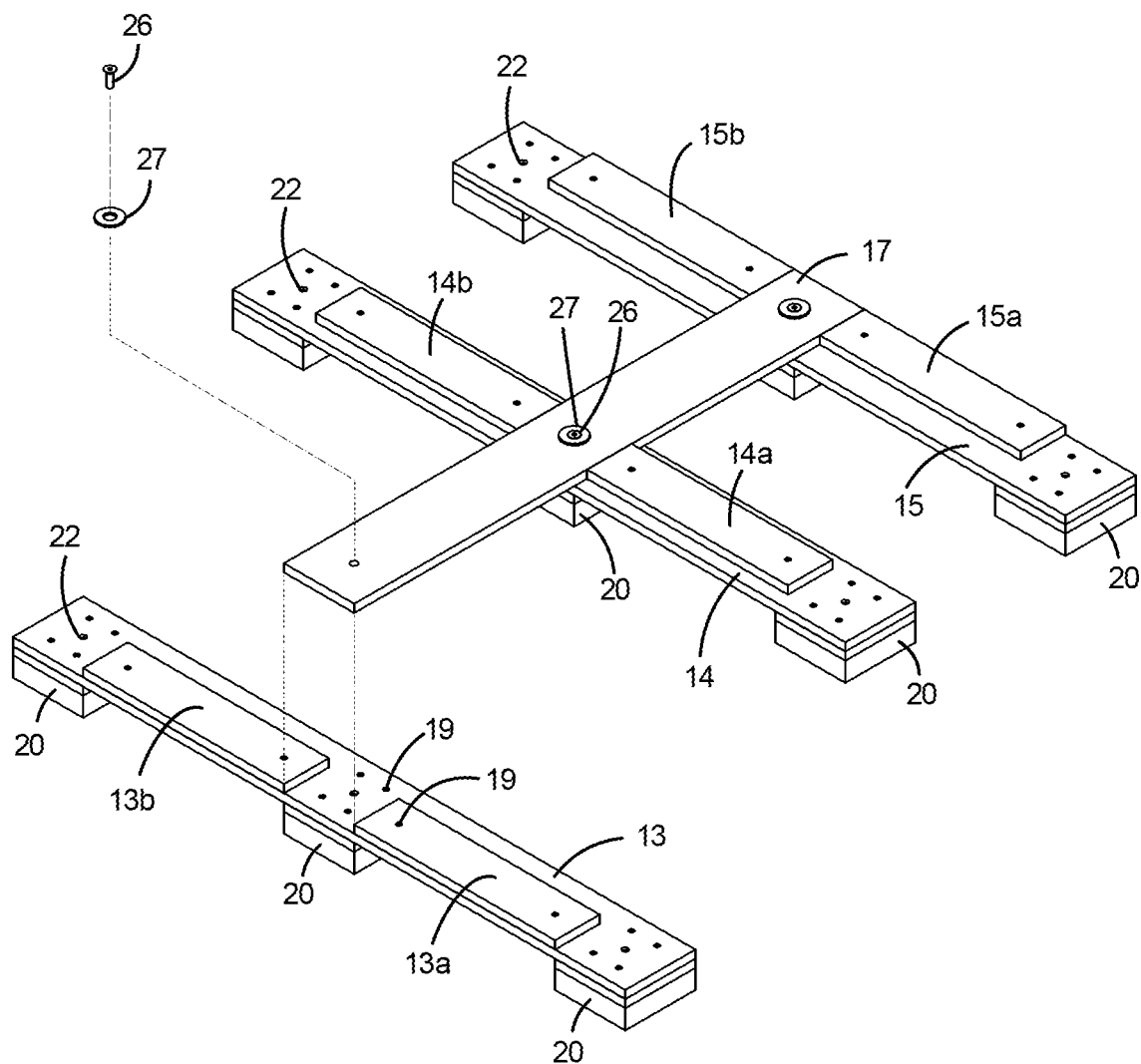
FIG. 5 is a partially exploded perspective view of the lower frame structure of FIG. 4, illustrating the relative connective placement of a central lateral frame member portion of the frame to underlying longitudinal frame member portions of the frame structure.
Figure 6:
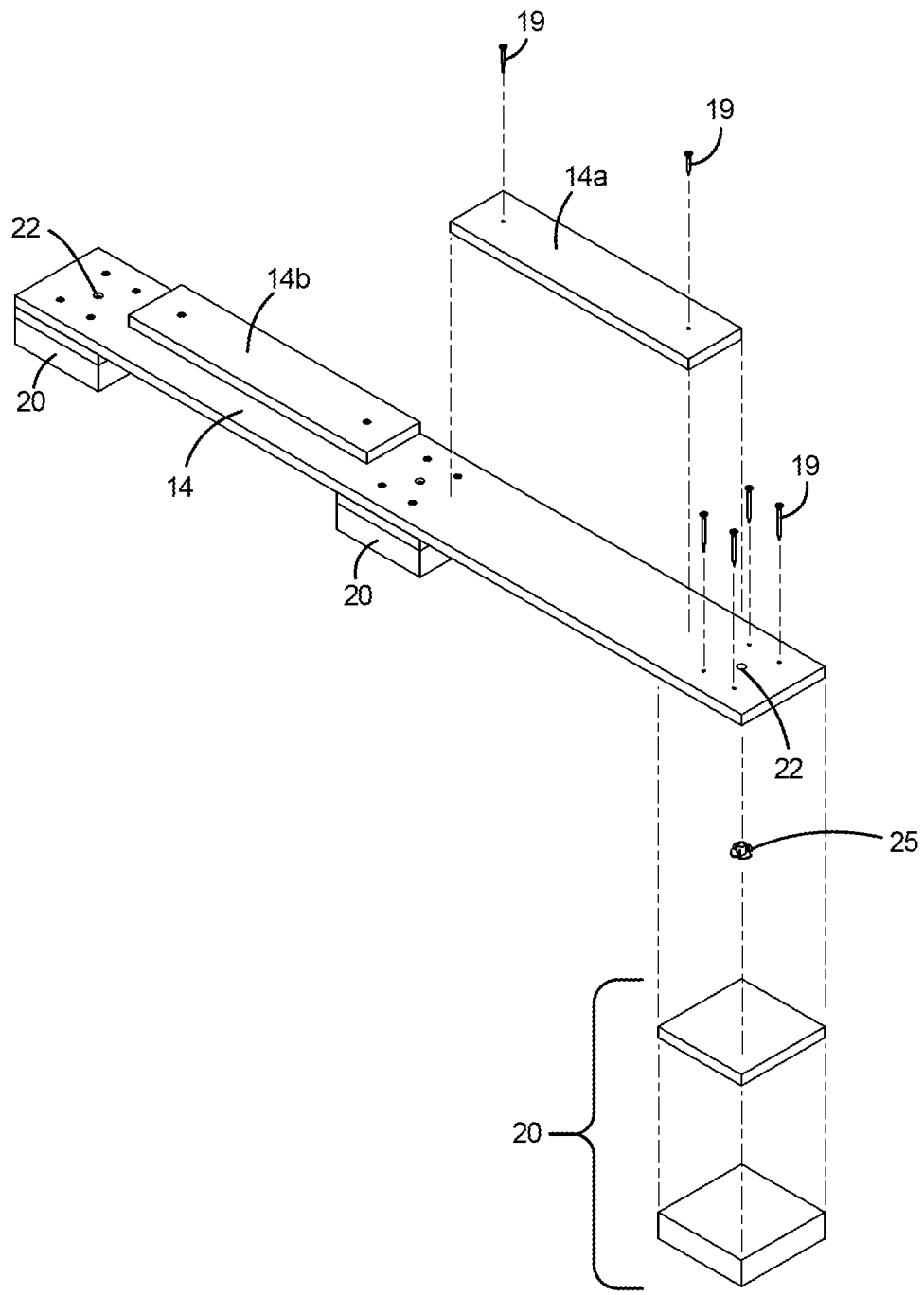
FIG. 6 is a partially exploded perspective view of the center longitudinal frame member portion of FIG. 4.

The leg anchoring screws 19 for each of the nine legs 20 are guided through five predrilled holes in the longitudinal frame members 13, 14, and 15 as shown in FIG. 6. Each of the positioning frame members 13a, 13b, 14a, 14b, 15a and 15b are also secured by screws 19 guided through predrilled holes in the respective positioning members, also illustrated in FIG. 6. Each of the longitudinal frame members 13, 14, and 15, and the lateral frame members 16, 17 and 18 has three 0.375" drilled holes centered and positioned near their ends and center areas. The holes 23 through the lateral frame members coaxially align with the underlying holes 22 of the longitudinal frame members. Insert nuts 25 (FIG. 6) are pressed into the nine drilled holes of the longitudinal frame members 13, 14 and 15. The insert nuts 25 have a coarse external tooth pattern to ensure maximum holding power to the wooden longitudinal frame members. The insert nuts are internally threaded to accept 0.375" bolts 26 (FIG. 5). The bolts 26 are first inserted through washers 27 and are then pushed downward through the drilled holes 23 in the lateral frame members and through the drilled holes 22 of the longitudinal frame members and are threaded into the insert nuts 25 to secure the upper lateral frame members 16, 17 and 18 to the lower longitudinal frame members 13, 14 and 15.

Figure 4:
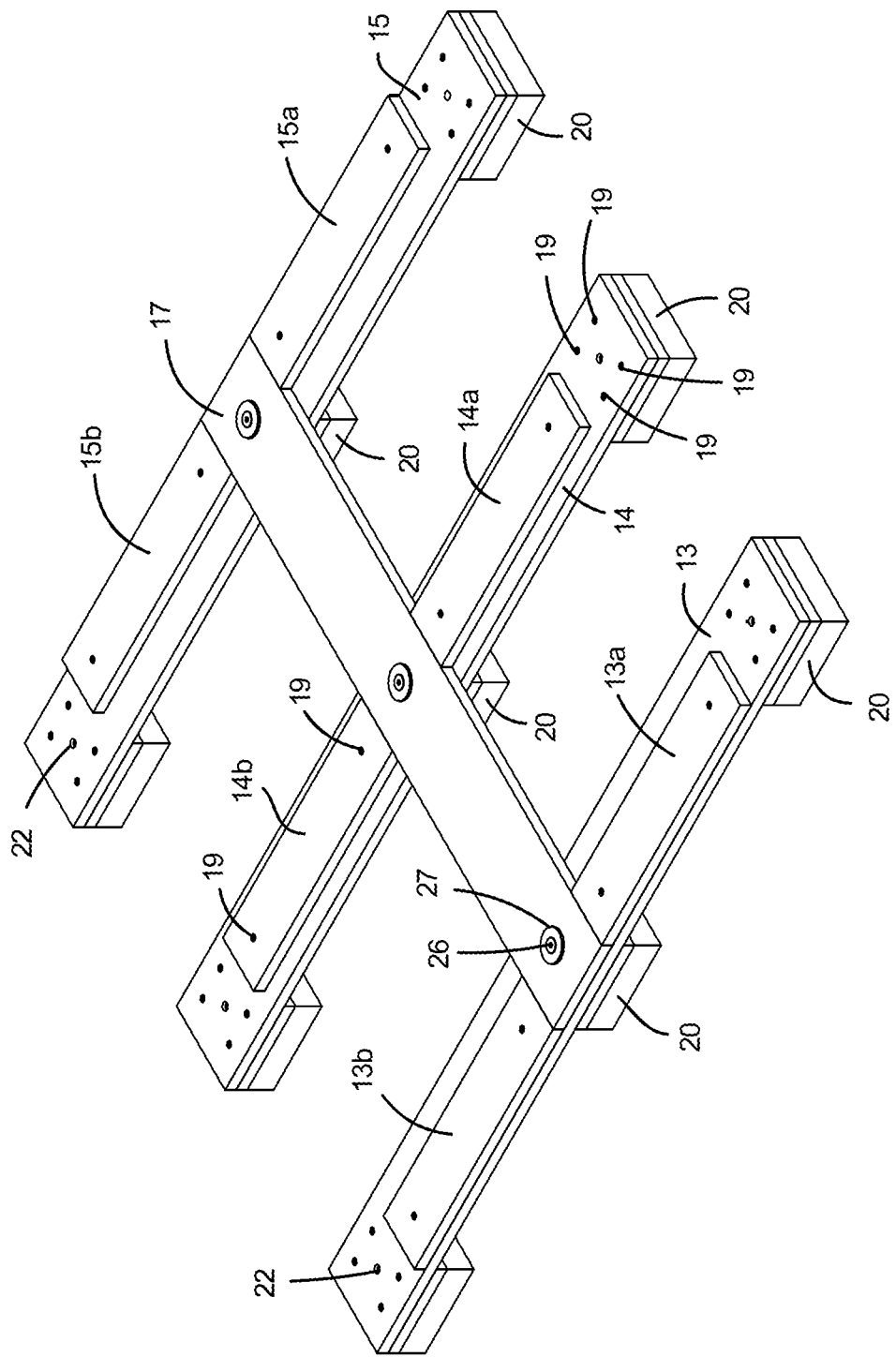
FIG. 4 is an enlarged perspective view of the lower frame portion of the pallet of FIG. 3.

In constructing the frame 12, the center lateral frame member 17 is aligned and snugly positioned between the spaced positioning frame members 13a and 13b, 14a and 14b, and 15a and 15b, and is secured to the longitudinal frame members 13, 14, 15 along their central receptor slots formed by the opposed positioning frame members. The central frame member 17 fits snugly and is horizontally retainably held in interlocking manner between the opposed engaged alignment boards and is vertically secured to the centrally located three insert nuts 25 of the longitudinal frame members 13, 14 and 15 by the bolts 26 and washers 27, rigidly aligning and connecting the central portions of the longitudinal frame members 13, 14 and 15 together as shown in FIG. 4. The frame structure is completed when the two lateral end frame members 16 and 18 as tautly secured to one another by one or more pieces of sheet material 30a, 30b (collectively shown in the upper portion of the exploded view of FIG. 3) are secured by bolts 26 and washer 27 to the outer receptor portions of the partially assembled frame segment illustrated in the lower portion of the exploded view of FIG. 3. The lateral frame end member 18 is lowered upon the aligned end receptor portions of one end of the longitudinal frame members 13, 14 and 15 such that the lower surface of the lateral support member 18 and attached portions of the sheet material 30a, 30b (as hereinafter described) engage the upper surfaces of the longitudinal support members 13, 14 and 15 and the inner side edge of the lateral support member 18 cooperatively abuts and engages the distal end surfaces of the positioning members 13b, 14b and 15b. In such position, the three spaced holes 23 formed through the lateral support member 18 will be coaxially aligned with the holes 22 formed through the longitudinal frame members 13, 14 and 15 and their respectively secured insert nuts 25. The lateral frame member 18 and one end of its attached fabric sheet portions 30a and 30b are then rigidly secured to the underlying longitudinal frame members 13, 14 and 15 by the bolts 26 and accompanying washers 27. The overlying fabric sheets of material 30a and 30b are then pulled tautly over the partially constructed frame 12 by moving the lateral frame member 16 until the holes 23 of the lateral frame member 16 are coaxially aligned with the holes 22 at the unsecured second end of the longitudinal frame members 13, 14 and 15 and their associated insert nuts 25. The lateral frame member 16 is then pressed securely down onto the aligned end receptor portions of the longitudinal frame members 13, 14 and 15 at their second ends, such that the lower surface of the lateral frame member 16 and attached portions of the sheet material 30a, 30b engage the upper surfaces of the longitudinal frame members 13, 14 and 15, and the inwardly positioned side edge of the lateral frame member 16 cooperatively abuts and engages the distal ends of the positioning frame members 13a, 14a and 15a. The lateral frame member 16 is then securely fastened to the insert nuts 25 through the aligned holes by means of the bolts 26 and their associated washers 27 to complete the interlocking frame 12 and assembly of the pallet 10, as illustrated in FIG. 1 and FIG. 2. When assembled, the upper surfaces of the three lateral frame members 16, 17 and 18 and all six of the positioning frame members 13a, 13b, 14a, 14b, 15a and 15b form a co-planar upper deck surface for the pallet, upon which the sheet material portions 30a and 30b rest, in tautly pulled manner. The sheet material spans and extends between the open spaces or gaps between the co-planar surfaces of the frame 12 forming the upper frame deck portion of the pallet, and along with the co-planar upper deck frame portions provides a strong upper support surface for the pallet. Two of the gaps between lateral frame members 16, 17, and 18, 17 are illustrated at G in FIG. 1. The positioning frame members 13a, 13b, 14a, 14b, 15a and 15b, besides completing the upper co-planar configuration of the frame 12 prevent racking/twisting of the assembled pallet structure. The tautly secured sheet material portions 30a, 30b of the pallet also serve to prevent racking/twisting of the assembled pallet structure.

In the embodiment(s) described herein, the sheet material comprises a flexible woven polypropylene mesh material known for its strength and light weight, of the type used for flexible intermediate bulk containers (NBC's) or Bulk Bags. The polypropylene woven mesh material is also preferably embedded with a liquid coating of polypropylene resin that enhances the fabric strength and waterproof properties. Such Bulk Bags are well known in the packaging industry for transporting large quantities (e.g. 2,000 lbs. or more) of bulk materials. Such FIBC polypropylene sheet materials typically have a safety working load strength of 5:1. For example, an FIBC specified to hold bulk material weighing 2,000 lbs. may have a strength rating capable of holding 10,000 lbs. of material with a 5:1 working load strength ratio. Woven FIBC material can be purchased from most any supplier of FIBCs such as from B.A.G. Corp. of Dallas, Tex. or from other suppliers and distributors such as Tech Packaging Group of Joplin, Mo. or National Paperboard Group, Inc. of Burnsville, Minn. The woven polypropylene sheet material has a mesh density of fabric weave measured as the number of yarns per inch in both the warp and weft directions (e.g. a 12×12 mesh) and is graded by weight, typically by so many ounces per square yard (e.g. 5.0 oz. or 6.0 oz./sq.yd. fabric material).

Such woven polypropylene sheet material has also been configured in seamless continuously woven tubular sleeve configurations to cooperatively overlie and engage the outer surfaces of cardboard forming members of bulk material containers. In such applications the woven sleeve material provides structural strength and stability to the container assembly, absorbing and counteracting radial forces applied by the bulk materials to the sleeve through the container forming member. General and more detailed descriptions of such known configurations of bulk material containers and their use of woven polypropylene and polyethylene materials and embedded polypropylene coatings are detailed in U.S. Pat. No. 6,932,266 entitled COLLAPSIBLE BULK MATERIAL CONTAINER, issued on Aug. 23, 2005 and U.S. Pat. No. 6,431,435 entitled COLLAPSIBLE BULK MATERIAL CONTAINER, issued on Aug. 13, 2002, the entire disclosures both of which are herein incorporated by reference.

One use of the pallet described in the first embodiment of the invention is, for example, for transporting large bulk material containers of the type described in the above referenced U.S. Pat. Nos. 6,932,266 and 6,431,435 which contain 2,000 lb. loads of semi-fluid meat materials such as chicken or liver. Such bulk material containers cover substantially the entire upper deck surface area of a pallet such as above described. A preferred pallet sheet material 30 for such applications is a 6 oz. or 6.5 oz. weight woven polypropylene material with embedded polypropylene coating, having a 5:1 safety working load strength of 10,000 lbs. The sheet material 30 preferably covers, but need not cover the entire upper deck surface of the frame 12, but should at least substantially cover the open spaces G between the longitudinal and lateral frame members which define the planar upper deck frame surface of the pallet, that would, for example, in prior art conventionally configured pallets contain supporting slats or stringers that have been removed or are not present in the described pallet frame embodiment structure(s) of this invention.

It will be understood that while a very strong woven polypropylene material has been described for use with the pallet of the disclosed embodiment(s), not all use applications require such strength. Much lighter weights of woven polypropylene or other materials, woven or non-woven, can be used for pallets required to transport lighter loads. For example, light unit loads (e.g. boxes containing breakfast cereals) do not require the superior strength of the FIBC woven fabric. A non-woven thermoplastic sheet material, such as that sold under DuPont's Tyvek® brand of flashspun high density polyethylene olefin fiber, would be suitable for such applications. Such material has a durable sheet structure with excellent burst strength and tear resistance, and is used for a number of industrial packaging applications such as industrial bags and sacks. The Tyvek® brand material elongates and will stretch up to 20-30% before breaking. Both woven and non-woven fabrics/sheets of material can be used to cover the open spaces between the top surfaces of the frame 12. The selection of appropriate sheet materials will be use/application driven and will be recognized by those skilled in the art.

Figure 7:
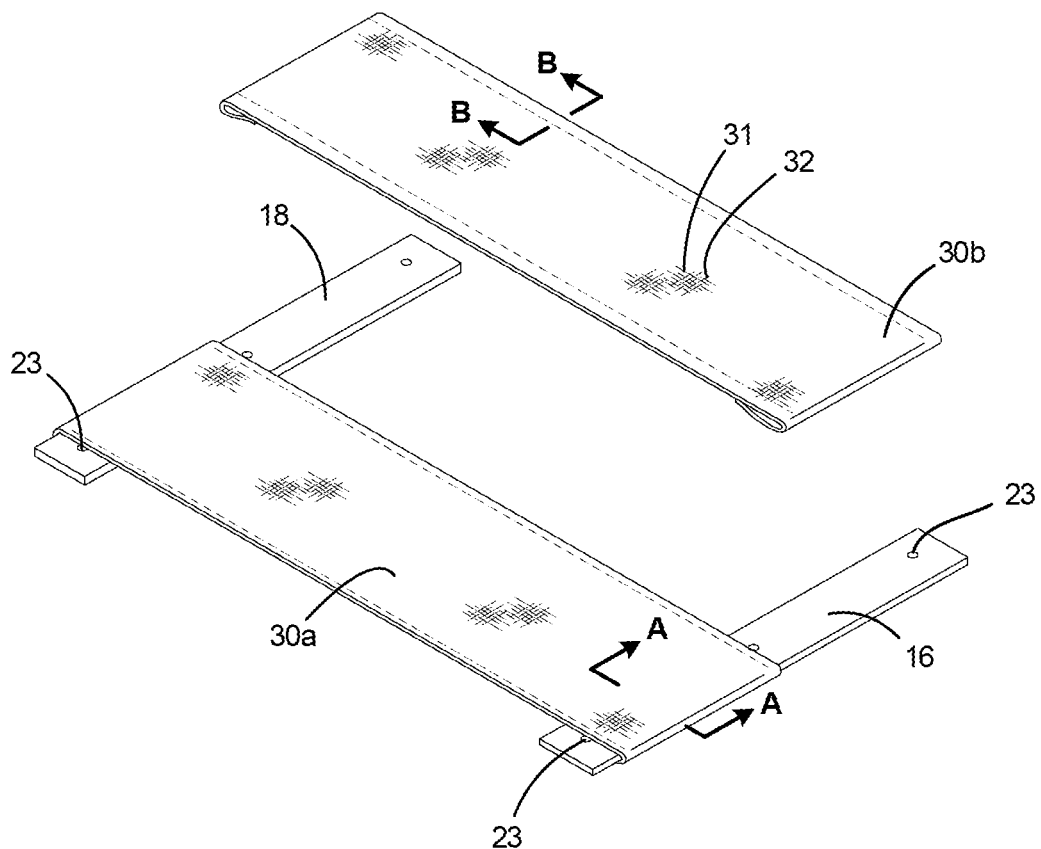
FIG. 7 is a partially exploded perspective view of the upper sheet material and lateral end frame member pallet portions of FIG. 3.
Figure 7A:
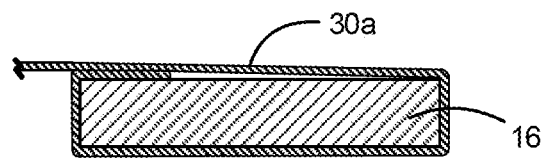
FIG. 7A is an enlarged diagrammatic cross-sectional view of the lateral frame member and overlying sheet material portions of FIG. 7, as generally viewed along the Line A-A of FIG. 7, illustrating how the sheet material is folded around the frame member and then tucked between the frame member and lower surface of the sheet material.

Assembly of the fabric sheet material 30a, 30b to the two lateral end frame members 16 and 18 is illustrated in more detail with reference to FIG. 7 and FIG. 7A. The length of each woven polypropylene sheet of material is sized long enough to span the length (48") of the longitudinal stringer plus an additional length of material to enable wrapping of the material around the lateral end frame member. In the embodiment illustrated, the extra fabric length required is the amount needed to wrap the material down the outer distal side of the lateral end frame member, back around the bottom surface of the lateral end frame member, up the inner side of the lateral end frame member, and back over a portion of the top surface of the lateral end frame member 16 and 18. This wrapping configuration is diagrammatically shown in FIG. 7A. FIG. 7A is a diagrammatic cross-sectional view as generally viewed along the Line A-A of FIG. 7. Such technique, not only assists in ensuring that the fabric can be strongly secured and tautly pulled between the two lateral end frame members 16 and 18, but also tucks the exposed threads along the "end" edges of the woven material 30a, 30b between the lower surface of the sheet material and the upper surface of the lateral end frame members 16 and 18—thus preventing possible fraying and/or unraveling and breaking off of the woven edge material that could be dislodged from the fabric and possibly fall into the bulk material contents upon unloading of the bulk material from the container supported by the pallet.

Figure 11:
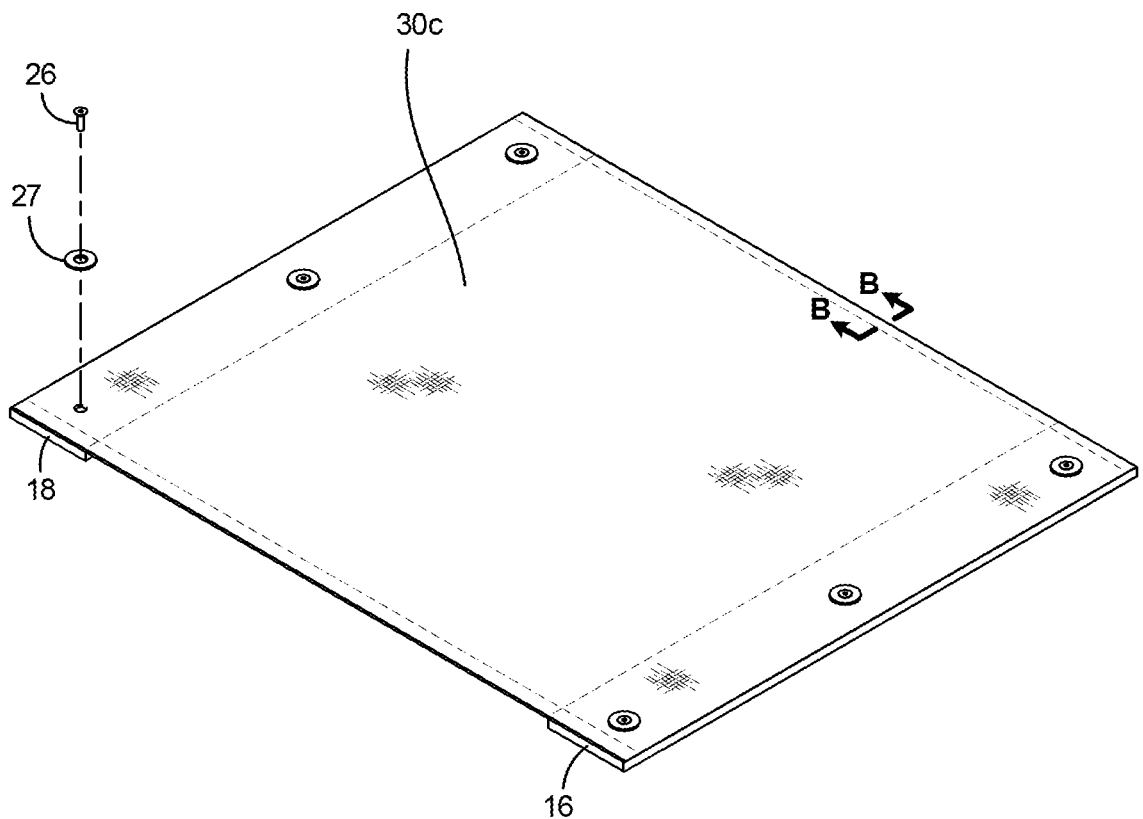
FIG. 11 is a diagrammatic perspective view of a second embodiment of the upper sheet material portion and attached lateral end frame member portions of FIG. 3, illustrating the sheet material portion thereof configured as a single piece of material.
Figure 12:
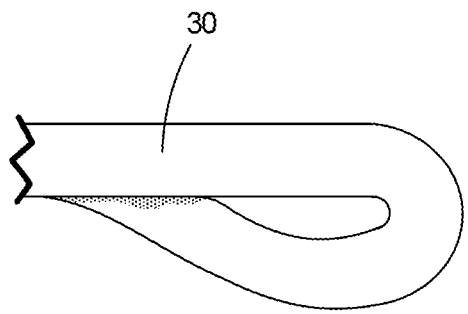
FIG. 12 is a diagrammatic cross-sectional view of a longitudinal edge portion of the upper sheet material of FIG. 7 and FIG. 11, taken along the Line B-B of FIG. 7 and FIG. 11, illustrating the folded over and hot fused edge configuration of the sheet material along the longitudinal edges of the sheet material.

Contamination of bulk material such as semi-fluid meats during unloading of the meat from the bulk material container, is of considerable concern in the industry. Bulk material containers carrying meat are generally emptied at the meat processing plant by grasping the bulk material container and physically tipping or pivoting the pallet with the gripped container, until the meat pours out of the container into an underlying processing receptor, until the container is empty. In such process any dislodged threads from a fabric (such as from the pallet fabric sheets 30a, 30b) could possibly fall into the emptied meat, contaminating the meat batch. Wrapping and tucking the end portions of the fabric as shown in FIG. 7A prevents such unraveling of the threads from the ends of the fabric sheet. The same consideration is of concern for the longitudinal edges of the fabric that cannot be easily wrapped or tucked under any portions of the pallet. However, that concern is also alleviated in this invention by having the longitudinal fabric edges tucked or rolled under the lower surface of the fabric, preferably at the factory during the weaving process, by about 0.25" and hot fusing the tucked under fabric edge portion to the lower surface of the fabric, thereby eliminating any exposed threads along the longitudinal edges of the fabric. Therefore, the fabric sheets 30a, 30b of the pallet remove threat of inadvertent threads being loosened from the fabric sheet that could contaminate the bulk material during handling and unloading of the containers carried by the pallet. An enlarged diagrammatic cross-sectional view of the hot fused fabric edge, as viewed generally along the Line B-B of FIG. 7 or FIG. 11 is illustrated in FIG. 12. The fabric folding-over and hot fusing process can be continuously performed on the longitudinal edges of the sheet material after weaving, preferably before the woven material is collected on large rolls which are subsequently unrolled and cut to the desired length for use on a pallet.

The fabric sheet material 30a, 30b which substantially or completely covers the upper surface of the pallet also provides a significant sanitation asset to use of the pallet, due to its location covering the top of the pallet. In use applications such as the large bulk material containers for meat that are tipped for emptying while on the pallet, any potentially contaminating dirt or debris on the bottom portions of the pallet, or any parts of the pallet frame including wood splinters, staples, nails or other metal or foreign objects that are dislodged from the pallet through use, age or handling, are blocked from falling into the product receptor container at the processing plant during unloading of the bulk container carrier. The bottom surface of the fabric sheet material helps to block such debris from falling downwardly into the processing plant receptor vat. Prior art pallets having an open upper deck and frame architecture with no covering have no such sanitation safeguard.

Figure 8:
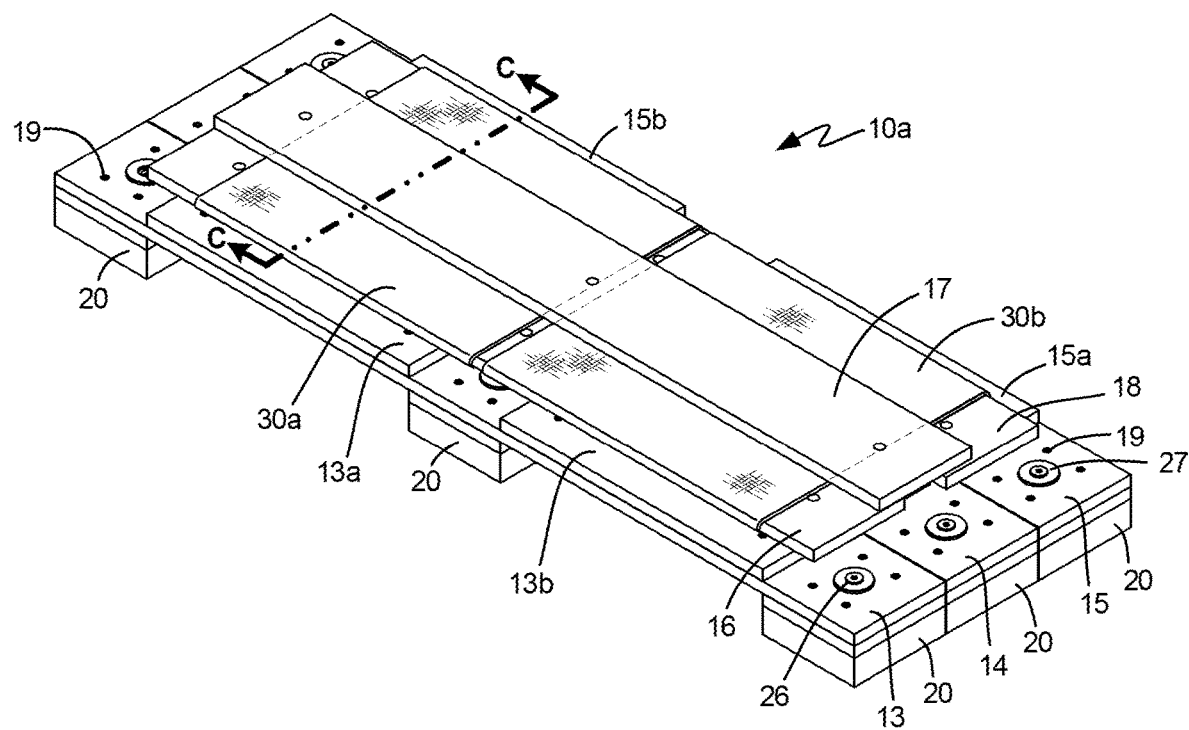
FIG. 8 is a diagrammatic perspective view of the pallet of FIG. 1, illustrated in collapsed configuration with the folded sheet material portion partially removed for illustration clarity of the relative collapsed positioning of the longitudinal and lateral frame portions of the pallet.
Figure 9:
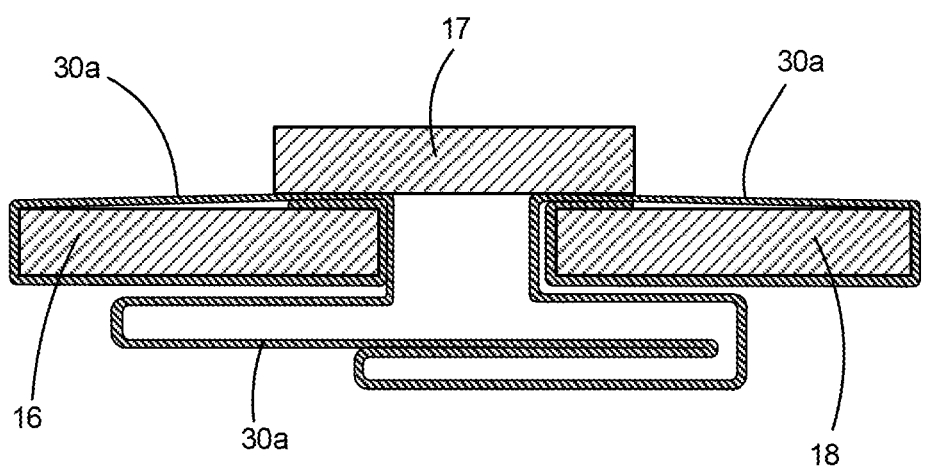
FIG. 9 is a diagrammatic partial cross-sectional view of the collapsed pallet configuration of FIG. 8, taken generally along the Line C-C of FIG. 8 illustrating how the sheet material portion of the collapsed pallet might appear when folded under the three lateral frame member portions of FIG. 8.

The unique pallet structure described above also enables the pallet to be readily disassembled, folded and compacted for storage and/or subsequent shipment back to its use source or to another facility. To disassemble the pallet, the upper fabric material 30a, 30b and lateral end frame members 16, 18 are removed from the remaining frame structure by removing the six bolts 26 and washers 27 connecting the frame members 16 and 18 to the lower longitudinal frame members 13, 14 and 15. The center lateral frame member 17 is then disconnected from the lower longitudinal frame members 13, 14, 15 by removing the three bolts 26 and washers 27 that secure it to the longitudinal frame members. The unconnected longitudinal frame members 13, 14, 15 with attached legs can now be positioned adjacent to each other as shown in FIG. 8, and the loose bolts 26 and washers 27 can be rethreaded through holes 22 and into the associated insert nuts 25 of the longitudinal frame members 13, 14 and 15. The two lateral end frame members 16 and 18 can be compacted toward each other by folding of the sheet material 30a, 30b underneath the lateral end frame members 16 and 18 in a number of different configurations, one of which is diagrammatically illustrated by the cross-sectional view of FIG. 9, which is viewed generally along the Line C-C of FIG. 8. The compacted fabric/longitudinal end frame member assembly can be placed on top of the lower longitudinal frame members 13, 14 and 15 with the center lateral frame member 17 on top of the compacted assembly as shown in FIG. 8, and bundled together as a compact reusable pallet 10a for subsequent storage and/or shipment. When needed again, the compacted pallet can be reassembled by reversing the disassembly process. The ease of disassembly and reassembly of the pallet also lends itself to easy replacement of worn or damaged components of the pallet, which is not generally possible with conventional known pallets. Further, the polypropylene fabric portion of the pallet can be readily recycled.

Figure 10:
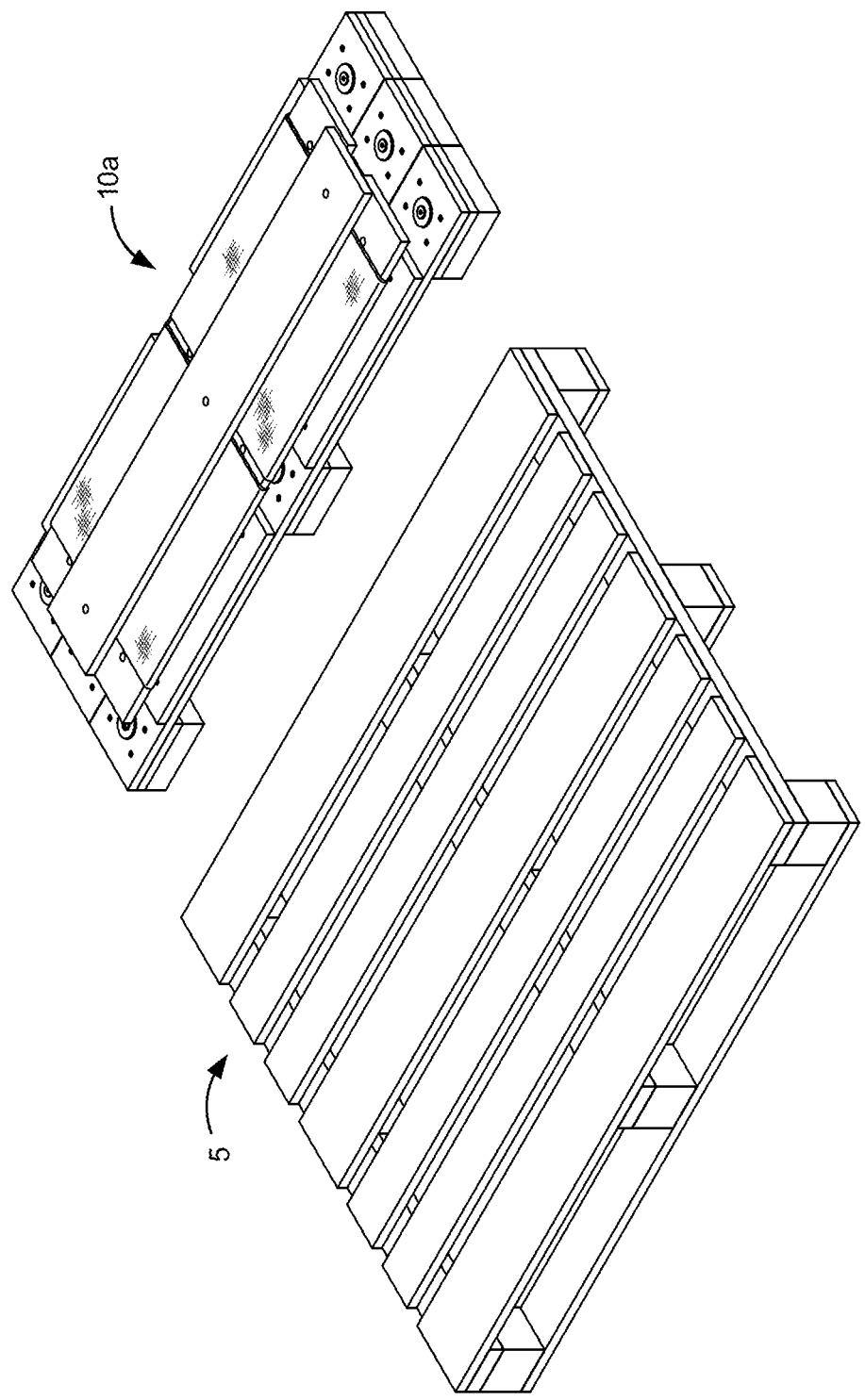
FIG. 10 is a diagrammatic perspective view illustrating relative size comparisons of the collapsed pallet configuration of FIG. 8 to that of a typical wooden pallet having the same upper surface footprint dimension as the pallet of FIG. 1.

FIG. 10 illustrates a relative size comparison of the collapsed (48"×40") pallet 10 of the present invention, at 10a, with that of a typically constructed conventional (48"×40") wooden pallet 5 of the prior art, having the same load specifications as that of the pallet of this invention. The volume of the collapsed pallet 10a is approximately 50% less than that of the conventional pallet 5, and uses significantly less wooden material in its construction.

The first embodiment pallet described above utilizes two longitudinally extending fabric sheets 30a, 30b for substantially covering the upper deck surface of the pallet. The invention is not limited to the use of any particular number of pieces of sheet material. More or less sheet material pieces can be used. Pallet configurations, for example, could be configured with "x" number of larger gap portions between components forming the upper deck that may require support from a sheet material. It may be desirable to configure and secure "x" number (or more or less than "x" number) of sheet material pieces spanning such gaps, to provide the desired load support strength across the gap/span region(s). A second pallet embodiment utilizing a single sheet of material for covering substantially all or all of the upper deck surface is described below. It will also be appreciated that due to load distribution of the load forces supported by the pallet across the deck surface area of the pallet, the fabric strength and related safety working load strength need not be calculated on the entire load weight, but only for that actual portion of the distributed weight that the deck gap or void area(s) need to support.

Figure 17:
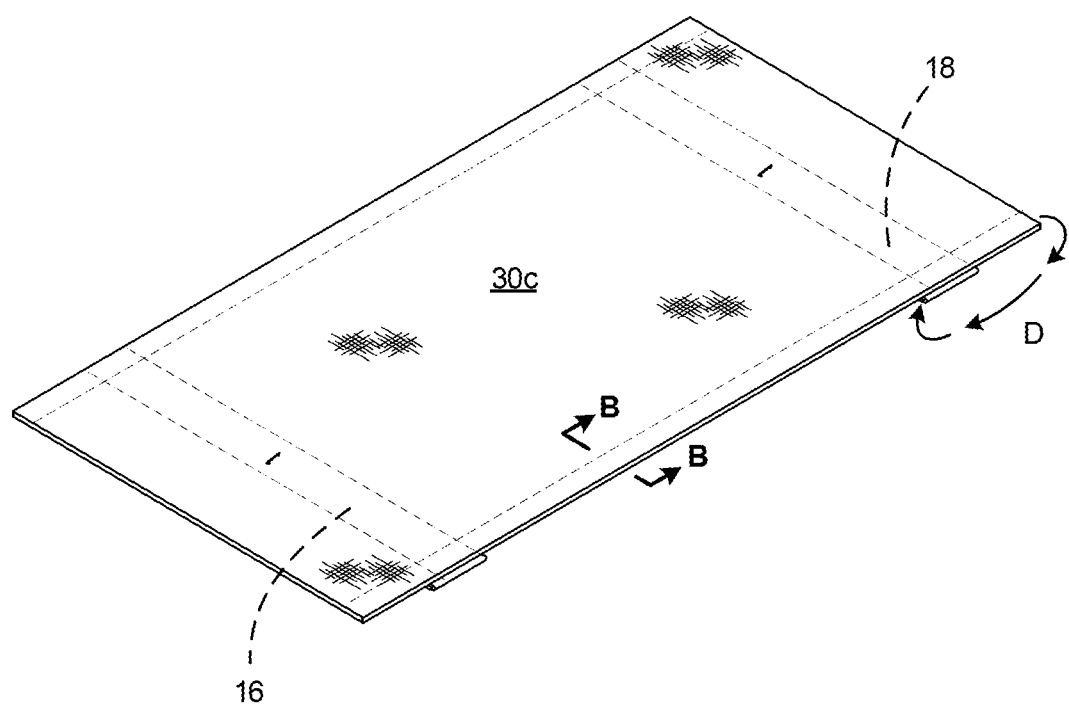
FIG. 17 is a diagrammatic perspective view of the upper sheet material and opposed lateral frame member end portions of the pallet of FIG. 15 illustrating the sheet material hot fused edge treatment areas and the longitudinal end portions of the fabric sheet prior to being folded over the distal edges of the lateral end frame member portions.

Referring to FIG. 11, a diagrammatic perspective view of a second embodiment of the upper fabric sheet portion and attached lateral end frame portions 16 and 18, similar to that of FIG. 3, is illustrated. The second fabric sheet material embodiment uses a single piece of sheet material 30c to cover the entire or substantially the entire upper deck area of the pallet 10. The FIG. 11 illustration shows the fabric sheet 30c with six of the bolts 26 and washers 27 configured through the sheet material, for securing the lateral end frame members 16 and 18 to the longitudinal frame members 13, 14 and 15. It will be noted that the frame structure 12 for the pallet 10 of the second embodiment remains the same as that of FIG. 3 for the first pallet embodiment, and that only the configuration of the upper sheet material 30c changes between the first and second embodiments. Six of the nine bolts 26 pass through the fabric sheet material 30c when securing the lateral end frame members 16 and 18 to the longitudinal frame members 13, 14 and 15. The three remaining bolts 26 and washers 27 secure the center lateral frame member 17 to the central portions of the longitudinal frame members 13, 14 and 15 and are positioned below the sheet material 30c. FIG. 17 illustrates placement of the sheet material 30c relative to the lateral end frame members 16 and 18 to which it will be secured. The extended end portions of the fabric material 30c will be wrapped around the lateral end frame members 16 and 17 as indicated by the arrows D in FIG. 17 in the same manner as the two pieces of sheet material 30a and 30b were wrapped, as illustrated by the diagrammatic cross-sectional view of FIG. 7A. As was the case for the sheet material pieces 30a, 30b for the first embodiment, the longitudinal edges of the sheet material 30c are folded under and hot fused to the lower surface of the sheet material 30c, as generally viewed from the cross-sectional Lines B-B of FIG. 17 and FIG. 11, and illustrated in FIG. 12, to prevent unravelling of the fabric sheet threads along the longitudinal edges of the sheet material 30c.

Certain pallet use applications for bulk material containers or other containers, for example of the type disclosed in the above cited U.S. Pat. Nos. 6,932,266 and 6,431,435, may have a container footprint dimension that is virtually the same size as that of the pallet deck perimeter dimension. Proper placement of the container on the pallet before loading of the container, or of an already loaded container can be critical to the safe shipment of the loaded container. If the container sidewalls extend over/beyond the pallet deck support perimeter, the container may rupture along that container portion which extends beyond or overhangs the pallet upper deck surface. This can be particularly problematic in cases where empty containers are simply tossed upon the pallet deck surface prior to loading, instead of being carefully placed upon the pallet to ensure that there is no container overhang beyond the pallet deck outer perimeter. An added feature of the present invention, which addresses this issue is to incorporate container centering devices into the pallet design, which extend above the plane of the pallet upper deck surface along the pallet deck surface perimeter, to assist in proper centering placement of containers when placed upon the pallet deck.

Figure 13:
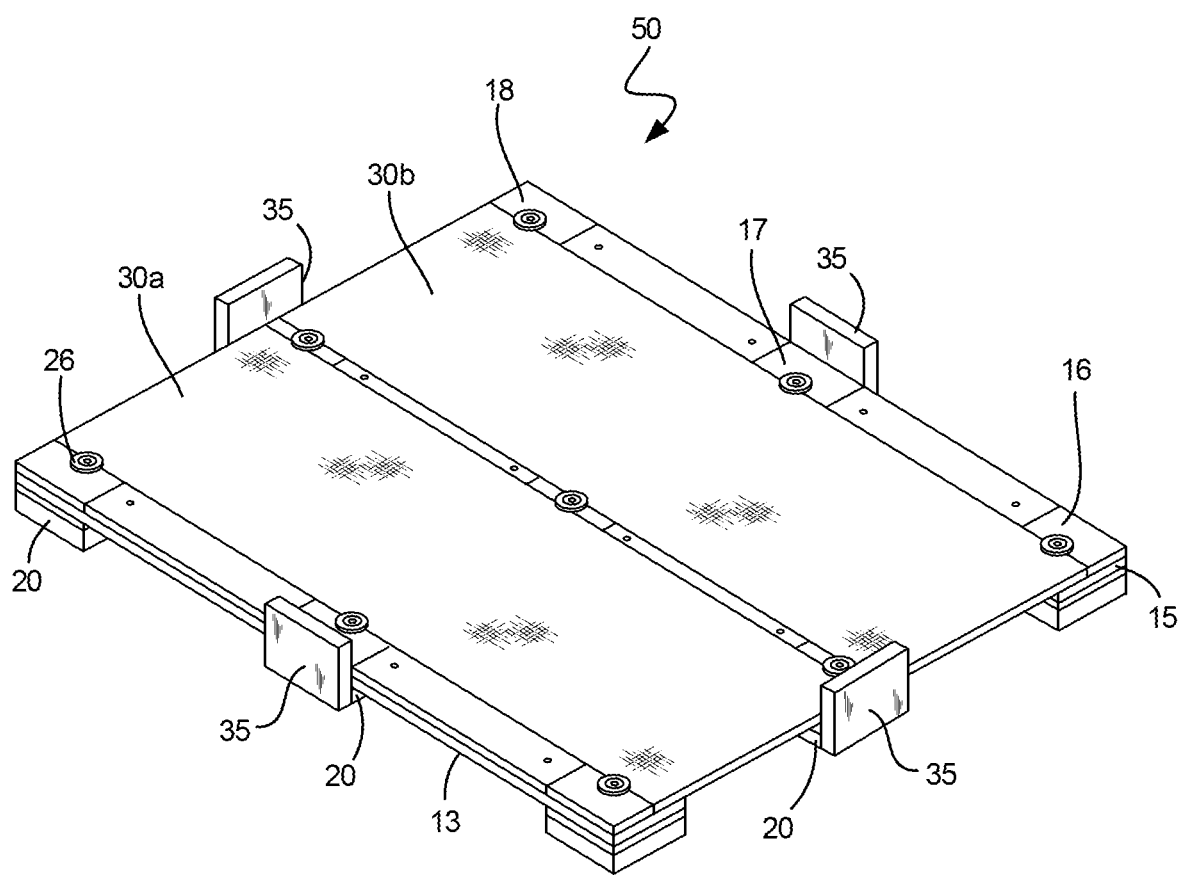
FIG. 13 illustrates the pallet of FIG. 1 including peripherally located container centering devices.
Figure 14A:
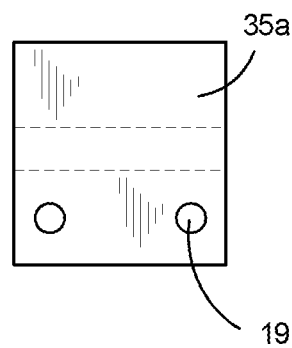
FIG. 14A is a front view of one of the centering devices of FIG. 13 shown secured to a central leg portion of the pallet.
Figure 14B:
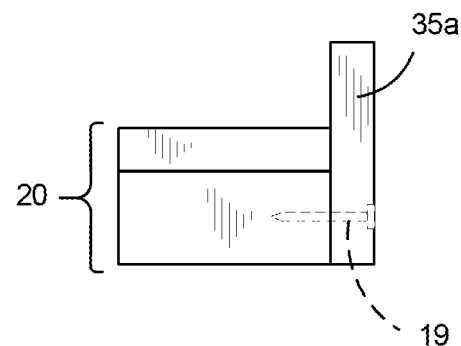
FIG. 14B is a left side view of the centering device configuration of FIG. 14A.
Figure 14C:
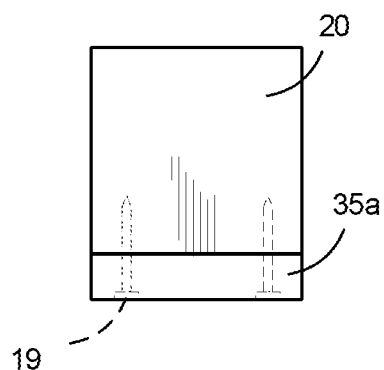
FIG. 14C is a top view of the centering device configuration of FIG. 14A.

FIG. 13 illustrates an example of a pallet 50 having centering devices 35 incorporated into the pallet configuration of FIG. 1. It will be understood, that such container centering devices are not limited to use on pallet configurations employing a sheet material incorporated into its deck design. In the embodiment illustrated in FIG. 13, the centering devices 35 are centrally located on all four sides of the pallet and are connected to the outer centrally located lea portions 20 of the pallet 50. Such location enables the centering devices not to interfere with or obstruct the Forklift access spaces 11 between the support legs 20. FIGS. 14A, 14B and 14C illustrate various views of a relatively simple centering device 35 configuration forming an outer extension of the central support legs 20. In the embodiment illustrated in FIGS. 14A, 14B, and 14C, the centering device simply comprises an additional wooden extension member 35a of the same width as the support legs 20 and secured to the support legs 20 by means of a pair of screws 19. The length of the upwardly extending portion 35a of the centering device 35 is sufficient to extend upwardly above the planar upper deck surface when secured to the support leg 20. The extent to which the centering member extends above the upper deck surface is a matter of design choice. It will be recognized by those skilled in the art that while a particular configuration of the centering device 35 has been illustrated with reference to the pallet construction 50 of FIGS. 13 and 14, that such centering devices can be configured from other materials or other designs that accomplish the same load centering purpose, as for example, by right angle plastic folding hinges that have a "living hinge" molded feature such that the hinge could fold down flat when the pallet is not in operative use, as for example when pallets are stacked for transport or shipment.

Figure 15:
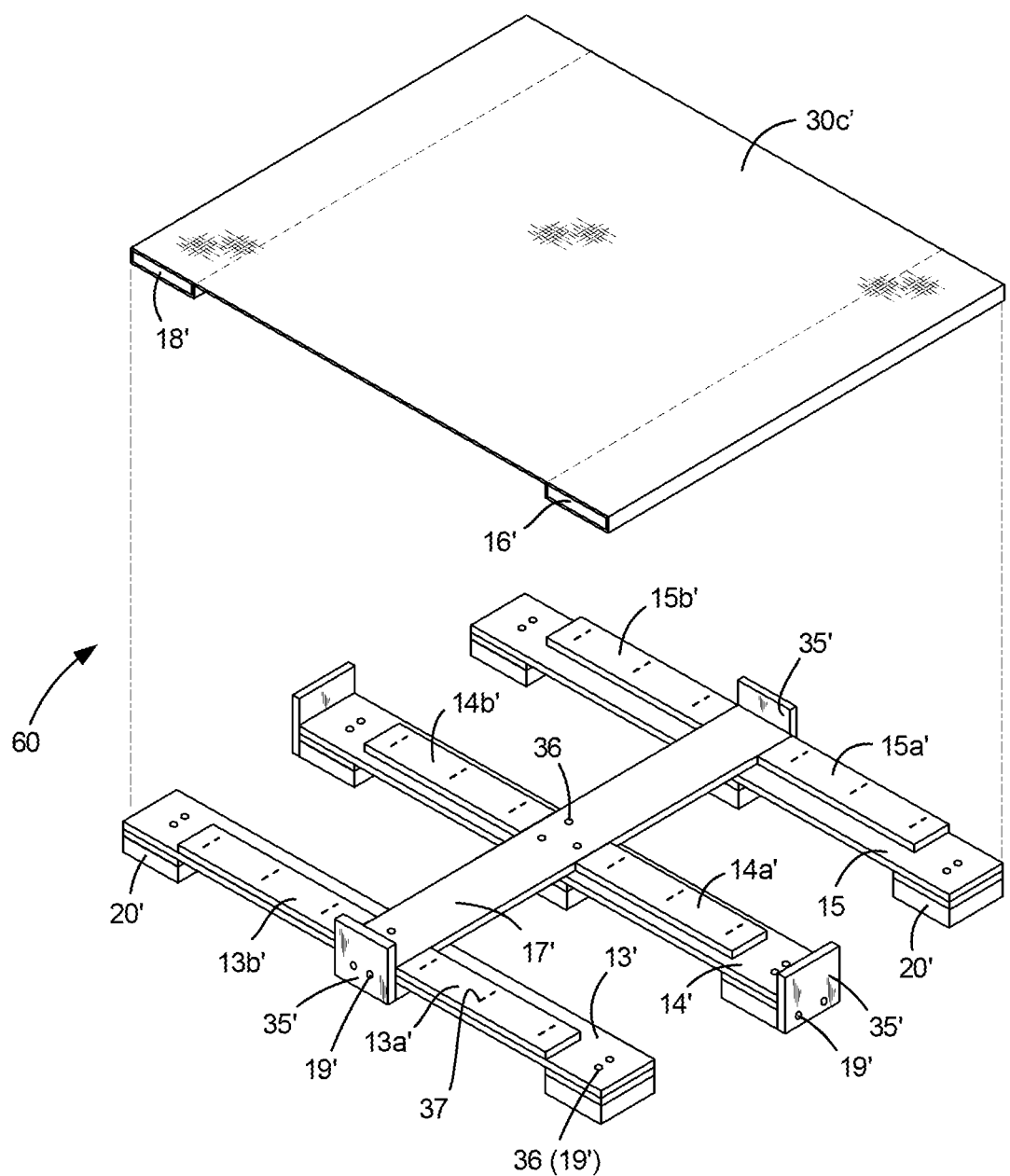
FIG. 15 is a diagrammatic partially exploded perspective view of a non-collapsible embodiment of a pallet, similar to that of FIG. 3, constructed according to the principles of this invention.
Figure 16:
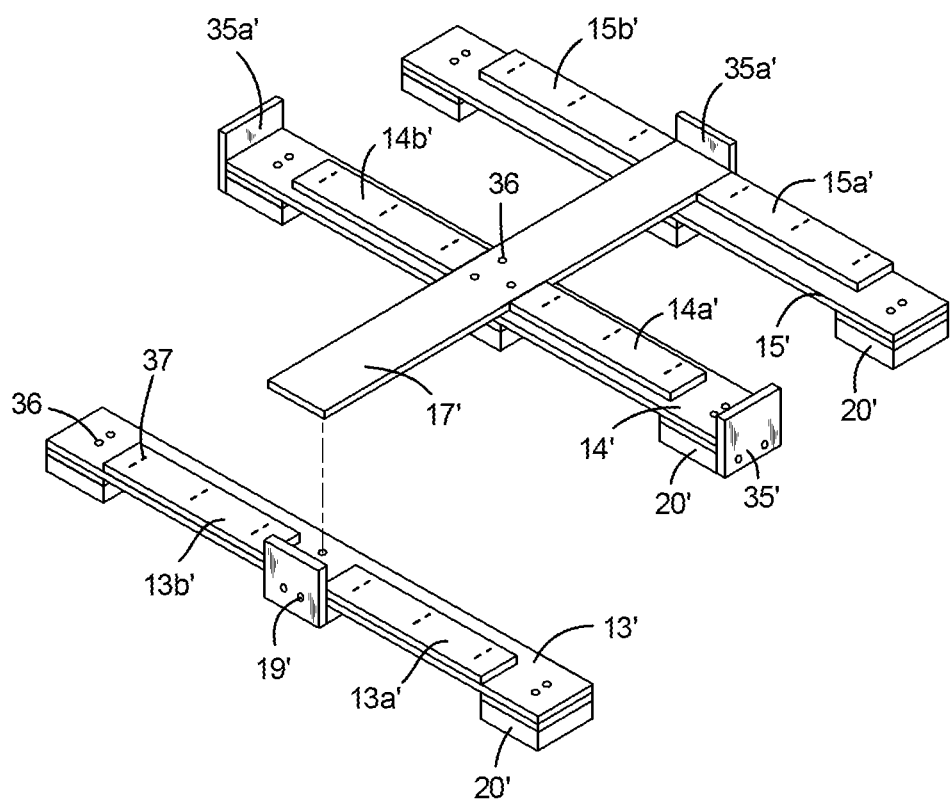
FIG. 16 is a partially exploded perspective view of the lower frame structure portion of the pallet of FIG. 15, illustrating the relative connective placement of the central lateral frame member portion of the frame to the underlying longitudinal frame member portions of the frame structure.
Figure 18:
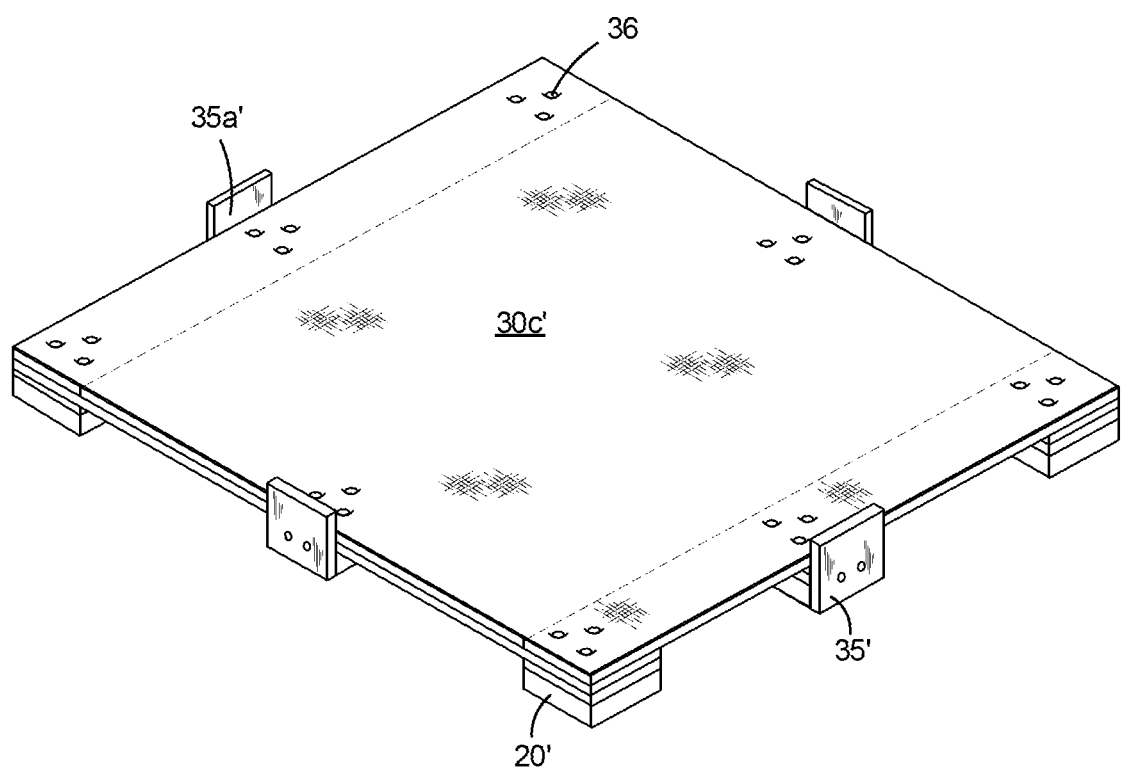
FIG. 18 is a perspective view of the assembled pallet of FIG. 15 illustrating securement of the upper sheet material and opposed lateral end frame members secured to the center lateral frame member and to the lower longitudinal frame members.

Use of a sheet material as a structural member for increasing the entire or selected portions of the pallet deck surface strength is not limited to collapsible pallet configurations. Use of a sheet material to strengthen the load capacity of a pallet, whether a woven or non-woven fabric type of material, is also advantageous in the construction of non-collapsible solid frame pallet constructions. An example of a third embodiment of a pallet 60, which incorporates the same basic interlocking frame construction as shown in prior embodiments, except that the frame members are rigidly secured together and not collapsible, is illustrated in FIGS. 15, 16 and 18. The various elements of the pallet 60 have the same numerical designations as those of the previously described pallet embodiments, with an additional prime (') designation.

Referring to FIGS. 15, 16 and 18, the lateral frame members 16', 17' and 18' are rigidly secured to the underlying longitudinal frame members 13', 14' and 15' by means of nails 36. The support legs 20' are also rigidly secured to the longitudinal support members 13', 14' and 15' by nails 36 or screws 19'. The embodiment illustrated in FIG. 15 also includes peripheral centrally located centering devices 35' secured to the support legs 20' by means of screws 19'. The centering device 35' construction and configuration is the same as that previously described with respect to prior embodiments. The positioning boards 13a', 13b', 14a', 14b', 15a' and 15b' are rigidly secured to the underlying longitudinal frame members 13', 14' and 15' by staples 37 or other appropriate securement means. The upper sheet material 30c' is folded around the lateral end frame members 16' and 18' in a manner as previously discussed (FIG. 7A) and is initially held in place by staples to the bottom surfaces (not shown) of the lateral end frame members 16' and 18', before the upper sheet material and lateral end frame member assembly is secured to the lower frame portion illustrated in FIG. 15. As with the previously described collapsible frame 12 constructions, the central lateral frame member 17' is first secured to the central longitudinal frame member 14' (FIG. 16) prior to securement of the lateral end frame members 16' and 18' to the lower longitudinal frame members 13', 14' and 15'. The upper fabric 30c' and secured lateral end frame (16', 18') sub-assembly of FIG. 15 is then positioned upon the lower partially assembled frame configuration of FIG. 15 as illustrated in FIG. 18, and the lateral end frame members 16' and 18' are secured to the longitudinal frame members 13', 14', 15' by means of a plurality of nails 36 as illustrated in FIG. 18. The nails 36 are driven through the upper sheet material 30c' but in a manner such that the nail heads do not puncture the sheet material fabric 30c'. Since the center portion of the lateral frame member 17' had already been secured to the lower longitudinal frame member 14', no nails are driven through the central portion of the sheet material 30c'.

As was the case with assembling the collapsible pallet configurations, when securing the fabric sheet 30c' and lateral end member 16', 18' assembly to the underlying longitudinal frame members 13', 14', 15', the lateral end frame member 18' and overlying fabric 30c' is first rigidly secured by nails 36 to first ends of the longitudinal frame members 13', 14', 15'. The fabric 30c' is then tautly pulled over the underlying frame structure until the lateral end frame member 16' aligns with receptor portions at the opposite, second ends of the longitudinal frame members 13', 14', 15', and the lateral end frame member 16' and overlying fabric sheet material 30c' is then rigidly secured by nails 36 to the longitudinal frame members 13', 14', 15' along their second ends.

The opposed ends of the central lateral frame member 17' and the overlying fabric sheet material 30c' are then secured by nails 36 to the underlying central portions of the longitudinal frame members 13', 14', 15', to complete the non-collapsible pallet 60 assembly.

The perimeter nails 36 securing the fabric 30c' and the lateral frame members 16', 17', 18' to the underlying longitudinal frame members 13', 14', 15' are strategically placed so as to avoid the underlying nails that secure the support legs 20' to the longitudinal frame members 13', 14' and 15'. Except for the fact that the pallet 60 is not collapsible, the rigid pallet assembly provides the same structural end use benefits as previously described with respect to the collapsible pallet 10 assembly.

It will be understood that other variations of the pallet constructions disclosed herein can be incorporated into the inventive pallet design. For example, in applications wherein the pallets with a supported load may be placed upon warehouse steel beam pallet racks with no inter-beam rack decking to support the pallet legs, additional boards can be secured to the bottoms of the legs of the pallet typically in the longitudinal direction, such that the pallet will rest upon the spaced steel pallet rack beams, straddling the open space(s) formed between the beams. This and other unique design features enabling a pallet to be used in diverse industries and storage facilities will be readily recognized by those skilled in the art.

The woven polypropylene fabric sheet material is continuously woven and collected on large rolls of the material prior to shipment to customers or cutting to length, smaller longitudinal segments of the material. The longitudinal running threads are referred to as the "warp threads", and the laterally oriented threads that are woven perpendicularly to the warp threads are referred to as the "weft threads". While the size or weight of the warp threads does not change in the weaving process, the size of the weft threads can be changed during the weaving process, to provide weft threads of different fabric weight as the weaving progresses. The pallet fabric warp direction threads are indicated at 31 and the weft direction threads at 32 in FIG. 1 and FIG. 7. Therefore it is possible to weave fabric sheet materials for the pallet that have heavier weft threads than warp threads, providing additional fabric strength in the lateral sheet direction. This configuration is favorable to the pallet designs described herein, since the extra fabric sheet strength in the lateral direction compensates and provides extra load support over those voids or gaps formed by the pallet frame where conventionally designed lateral stringers have been removed from the pallet deck surface. Such fabric design can provide the extra lateral support without suffering extra fabric weight that would be present if such heavier weight threads were used for weaving both the warp and the weft threads. Fabric weaving of sheet materials having heavier weft yarns in selected longitudinally spaced portions of a pallet covering fabric sheet material that identically or selectively coincide with longitudinally spaced void or gap regions of the pallet frame structure (for example as indicated for the longitudinally spaced fabric regions "G" of FIG. 1.) could also be configured within the scope of this invention.

From the above embodiment descriptions, it will be appreciated that the sheet materials used in construction of the pallet configurations, are not merely providing a top cover for the pallet upper deck surface. Covering the gaps or spaces between adjacent stringer members forming the deck surface to provide the pallet with additional sanitation advantages is an added by-product of the primary function provided by the sheet material of this invention. The sheet material's primary function is to provide significant structural strength to the pallet deck surface in those gap areas formed between adjacent rigid deck frame members sufficient to safely support a load for which the pallet is designed to carry. The sheet material fabric spanning the gap areas between adjacent pallet frame members forming the pallet deck, has a strength that counteracts downward forces applied by a load engagably overlying the sheet material on the pallet deck surface, that is equal to or greater than the downwardly applied load forces. The sheet material has a working load strength ratio (for the load for which the pallet is designed) of at least 2:1 or more, and more preferably of 5:1. Also, as previously stated, by tautly securing the sheet material across the width or length of the pallet, the strength of the sheet material assists in stabilizing the pallet itself by preventing racking/twisting of the assembled pallet.

The above specifications, examples, and data provide complete descriptions of the various embodiments of the invention. Since many embodiments of the invention can be made without departing from the spirit and scope of the invention, the invention resides in the claims hereinafter appended.

What is claimed is:

1. A pallet configured to rest upon a lower support surface and to support a load having a maximum load weight, the pallet comprising:
   (a) a frame having a plurality of interconnected first and second frame members oriented perpendicularly to one another with at least one of said first and at least one of said second frame members having coplanar upper surfaces cooperatively defining a planar upper deck surface with at least one void or gap region in said planar deck surface;
   (b) a continuous sheet of material overlying said planar upper deck surface, secured to and tautly stretched between at least two of opposed first frame members and overlying said at least one void or gap region in said plane to support a load; and
   (c) spaced leg members operatively connected to said frame so as to support said upper deck surface in spaced relationship above said lower support surface, to enable pallet lifting arms to be inserted between said leg members and under said upper deck to lift said pallet above said lower support surface; and
   wherein the second frame members include end recesses at each distal end portion of each second frame member, the recesses being configured to receive and interlock with each opposed first frame member.

2. The pallet of claim 1, wherein the second frame members include recesses between the end recesses configured to receive at least one of the first frame members.

3. The pallet of claim 1, wherein said first and second frame members comprise wood.

4. The pallet of claim 1, wherein said first and second frame members are detachably secured to one another such that said pallet can be disassembled and compacted for transport or storage, and reassembled for operative use.

5. The pallet of claim 4, wherein the volume of the compacted disassembled pallet is at least 20 percent less than that of the assembled pallet.

6. The pallet of claim 5, wherein the volume of the compacted disassembled pallet is at least 40 percent less than that of the assembled pallet.

7. The pallet of claim 1, wherein said upper deck surface has a plurality of void or gap regions, and wherein said sheet material overlies said plurality of void or gap regions.

8. The pallet of claim 7, wherein said sheet material comprises a plurality of sheets of material which collectively overlie said plurality of void or gap regions.

9. The pallet of claim 1, wherein said sheet material overlies substantially the entire planar upper deck surface.

10. The pallet of claim 1, wherein said sheet material comprises a woven fabric material.

11. The pallet of claim 10, wherein said woven fabric sheet material comprises polypropylene material.

12. The pallet of claim 11, wherein said sheet material has a fabric weight equal to or greater than 5 ounces per square yard.

13. The pallet of claim 11, wherein opposed longitudinal edges of said stretched sheet material are folded over and sewed or hot fused to a bottom surface of said sheet material.

14. The pallet of claim 1, wherein said sheet material has a working load strength ratio compared to said maximum load weight, of greater than or equal to 2:1.

15. The pallet of claim 14, wherein said sheet material has a working load strength ratio compared to said maximum load weight, of greater than or equal to 5:1.

16. The pallet of claim 1, further comprising load centering devices operatively secured to said pallet and extending upwardly above the upper planar surface of the deck along opposed edges of the pallet deck surface, to assist in positioning and centering containers on said upper deck surface.

17. A pallet for supporting a load contained within a container having a bottom surface defining an outer peripheral footprint pattern, the pallet comprising:
(a) a pallet frame structure including lateral and longitudinal frame members that include coplanar upper surfaces that cooperatively define a planar upper deck surface for supporting said container;
(b) container centering devices operatively secured along opposed outer edges of said deck surface peripheral footprint and rising above said planar upper deck surface; and
(c) at least one flexible sheet of material overlying said planar deck upper surface, the flexible sheet of material being secured to opposed lateral frame members, wherein a termination of the flexible sheet of material at the lateral frame member is sandwiched and positioned between the lateral frame member and the longitudinal frame member.

18. The pallet of claim 17, further comprising a plurality of spaced leg portions operatively connected to or forming a part of said pallet frame structure, arranged and configured to support said upper deck surface in spaced relationship above a lower support surface, to enable pallet lifting arms to be inserted between said spaced leg portions and below said upper deck to lift said pallet above said lower support surface; and wherein at least some of said container centering devices are aligned with said leg portions, so as to not interfere with lifting operations of the pallet.

19. A collapsible pallet for supporting a load, the pallet comprising:
(a) a plurality of longitudinal frame members, oriented in parallel spaced relationship to one another and having coplanar upper portions;
(b) a plurality of lateral frame members operatively connected to said longitudinal frame members, oriented in parallel spaced relationship to one another and perpendicular to said longitudinal frame members, said lateral frame members having upper surfaces that are coplanar with said coplanar upper portions of said longitudinal frame members and cooperatively form therewith a planar upper deck surface;
(c) said longitudinal and said lateral frame members being rigidly, but detachably, secured to one another, so as to form one or more gaps or voids in the planar upper deck surface; and
(d) at least one flexible sheet of material overlying said planar deck upper surface, tautly secured to opposed ones of said lateral frame members and arranged and configured to overlie and span across at least one of said gaps or voids in the planar upper deck surface to strengthen said upper deck surface;
wherein at least one of the longitudinal or lateral frame member includes a recess in its upper surface configured to receive the other of the longitudinal or lateral frame member in an interlocking manner resulting in the coplanar upper portion.

20. The pallet of claim 19, wherein said longitudinal and lateral frame members are detachable from one another in a manner such that when detached, they can be compacted for transport and storage and readily reassembled into an operative pallet.

21. The pallet of claim 19, wherein said sheet material comprises polypropylene fabric configured to span across substantially the entire planar upper deck surface of said pallet.

* * * * *